(12) United States Patent
Lee et al.

(10) Patent No.: US 9,666,173 B2
(45) Date of Patent: May 30, 2017

(54) METHOD FOR PLAYING VIRTUAL MUSICAL INSTRUMENT AND ELECTRONIC DEVICE FOR SUPPORTING THE SAME

(71) Applicant: Samsung Electronics Co., Ltd., Suwon-si, Gyeonggi-do (KR)

(72) Inventors: Jae Hak Lee, Gumi-si (KR); Doo Yong Park, Gumi-si (KR); Young Gyun Lee, Gumi-si (KR); Young Dae Lee, Daegu (KR); Eun Jung Seo, Gumi-si (KR); Dong Guen Hong, Daegu (KR); Lae Hyuk Bang, Gumi-si (KR); Eun Yeung Lee, Gumi-si (KR); Cheong Jae Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/228,615

(22) Filed: Aug. 4, 2016

(65) Prior Publication Data

US 2017/0047056 A1 Feb. 16, 2017

(30) Foreign Application Priority Data

Aug. 12, 2015 (KR) ........................ 10-2015-0113725

(51) Int. Cl.
*A63H 5/00* (2006.01)
*G04B 13/00* (2006.01)
(Continued)

(52) U.S. Cl.
CPC .............. *G10H 1/34* (2013.01); *G10H 3/146* (2013.01); *G10H 2220/096* (2013.01); *G10H 2220/106* (2013.01); *G10H 2220/201* (2013.01)

(58) Field of Classification Search
CPC .... G10H 1/34; G10H 3/146; G10H 2220/096; G10H 2220/201; G10H 2220/106
(Continued)

(56) References Cited

U.S. PATENT DOCUMENTS 8,222,507 B1 * 7/2012 Salazar ................ G10H 1/0008
84/602
8,362,347 B1 * 1/2013 Scharfeld ............. G09B 15/023
84/470 R
(Continued)

FOREIGN PATENT DOCUMENTS

KR 10-2011-0064530 A 6/2011
KR 10-2014-0145643 A 12/2014

*Primary Examiner* — Jeffrey Donels
(74) *Attorney, Agent, or Firm* — Jefferson IP Law, LLP

(57) ABSTRACT

An electronic device is provided. The electronic device includes a touch screen display, at least one of a speaker and a sound interface, a processor configured to electrically connect to the touch screen display, the speaker, and the sound interface, and a memory configured to electrically connect to the processor. The memory stores instructions for, when executed, causing the processor to display at least one item comprising a musical instrument shape on the touch screen display, receive a touch input through the touch screen display, load sound data corresponding to the at least one item based on the touch input, process the sound data based at least in part on information associated with the touch input, and output the processed sound data through the speaker or the sound interface.

20 Claims, 19 Drawing Sheets

(51) Int. Cl.
  *G10H 7/00* (2006.01)
  *G10H 1/34* (2006.01)
  *G10H 3/14* (2006.01)

(58) Field of Classification Search
  USPC .......................................................... 84/609
  See application file for complete search history.

(56) References Cited

U.S. PATENT DOCUMENTS

| | | | |
|---|---|---|---|
| 8,426,716 B2 | 4/2013 | Little et al. | |
| 8,516,386 B2 | 8/2013 | Adam et al. | |
| 8,525,014 B1* | 9/2013 | Scharfeld | G10H 1/053 84/662 |
| 8,626,324 B2* | 1/2014 | Lengeling | G06F 3/04886 700/94 |
| 8,772,621 B2* | 7/2014 | Wang | G10H 1/0008 84/477 R |
| 8,809,665 B2* | 8/2014 | Patterson | G06F 3/04883 84/615 |
| 8,835,738 B2* | 9/2014 | Little | G10H 1/38 84/613 |
| 8,866,846 B2* | 10/2014 | Kim | G10H 1/24 345/173 |
| 8,884,888 B2* | 11/2014 | Chin | A63F 13/10 345/173 |
| 8,937,237 B2* | 1/2015 | Little | G10H 1/0008 84/609 |
| 9,035,162 B2* | 5/2015 | Hamilton | G10H 1/0016 84/613 |
| 9,082,380 B1* | 7/2015 | Hamilton | G10H 1/368 |
| 9,196,234 B2 | 11/2015 | Little et al. | |
| 2011/0134061 A1 | 6/2011 | Lim | |
| 2011/0252951 A1* | 10/2011 | Leavitt | G10H 1/40 84/645 |
| 2011/0316793 A1 | 12/2011 | Fushiki | |
| 2012/0006181 A1* | 1/2012 | Harada | G10H 1/0008 84/600 |
| 2012/0007884 A1 | 1/2012 | Kim | |
| 2012/0050176 A1* | 3/2012 | Chin | A63F 13/10 345/173 |
| 2012/0071994 A1 | 3/2012 | Lengeling | |
| 2012/0079410 A1* | 3/2012 | Adam | G06F 3/04886 715/773 |
| 2012/0174735 A1* | 7/2012 | Little | G10H 1/0008 84/613 |
| 2012/0174736 A1* | 7/2012 | Wang | G10H 1/0008 84/622 |
| 2013/0180385 A1* | 7/2013 | Hamilton | G10H 1/0016 84/603 |
| 2013/0233158 A1 | 9/2013 | Little et al. | |
| 2013/0318464 A1 | 11/2013 | Lengeling | |
| 2014/0059471 A1 | 2/2014 | Adam et al. | |
| 2014/0083279 A1* | 3/2014 | Little | G10H 1/0008 84/609 |
| 2014/0349761 A1* | 11/2014 | Kruge | A63F 13/426 463/35 |
| 2015/0114209 A1* | 4/2015 | Little | G10H 1/38 84/613 |
| 2015/0310844 A1 | 10/2015 | Little et al. | |

* cited by examiner

METHOD FOR PLAYING VIRTUAL MUSICAL INSTRUMENT AND ELECTRONIC DEVICE FOR SUPPORTING THE SAME

CROSS-REFERENCE TO RELATED APPLICATION(S)

This application claims the benefit under 35 U.S.C. §119(a) of a Korean patent application filed on Aug. 12, 2015 in the Korean Intellectual Property Office and assigned Serial number 10-2015-0113725, the entire disclosure of which is hereby incorporated by reference.

TECHNICAL FIELD

The present disclosure relates to virtual musical instruments of electronic devices.

BACKGROUND

Recently, electronic devices may provide various functions to their users. Each of the electronic devices may provide a touch function as an input means.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for playing a virtual musical instrument to determine an input tool when a gesture (e.g. a touch input, motion recognition, voice recognition, and the like) is generated and to provide an adaptive output change based on the input tool and a touch or gesture state and an electronic device for supporting the same.

In accordance with an aspect of the present disclosure, an electronic device is provided. The electronic device includes a touch screen display (or a touch screen interface), at least one of a speaker and a sound interface, a processor configured to electrically connect to the touch screen display, the speaker, and the sound interface and a memory configured to electrically connect to the processor. The memory stores instructions for, when executed, causing the processor to display at least one item comprising a musical instrument shape on the touch screen display, receive a touch input through the touch screen display, load sound data corresponding to the at least one item based on the touch input, process the sound data based at least in part on information associated with the touch input and output the processed sound data through the speaker or the sound interface.

In accordance with another aspect of the present disclosure, an electronic device is provided. The electronic device includes a display, at least one of a speaker and a sound interface, a processor configured to electrically connect to the display, the speaker, and the sound interface, and a memory configured to electrically connect to the processor. The memory stores instructions for, when executed, causing the processor to obtain a gesture of a user of the electronic device through at least one sensor operatively connected with the electronic device, output sound data corresponding to at least one musical instrument through an output device operatively connected with the electronic device, if the gesture is a gesture corresponding to at least one musical instrument, and not output the sound data, if the gesture is not the gesture corresponding to the at least one musical instrument.

In accordance with yet another aspect of the present disclosure, a method for playing a virtual musical instrument in an electronic device including a memory for storing at least one sound data corresponding to at least one musical instrument is provided. The method includes obtaining a gesture of a user of the electronic device through at least one sensor operatively connected with the electronic device, outputting the at least one sound data through an output device operatively connected with the electronic device, if the gesture is a gesture corresponding to the at least one musical instrument, and not outputting the sound data, if the gesture is not the gesture corresponding to the at least one musical instrument.

In accordance with still another aspect of the present disclosure, a computer-readable recording medium is provided. The medium stores embodied thereon instructions for, when executed by at least one processor, causing the processor to perform at least one operation. The at least one operation is configured to obtain a gesture of a user of the electronic device through at least one sensor operatively connected with the electronic device, the electronic device including a memory for storing at least one sound data corresponding to at least one musical instrument, output the at least one sound data corresponding to the at least one musical instrument through an output device operatively connected with the electronic device, if the gesture is a gesture corresponding to the at least one musical instrument, and not output the sound data, if the gesture is not the gesture corresponding to the at least one musical instrument.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
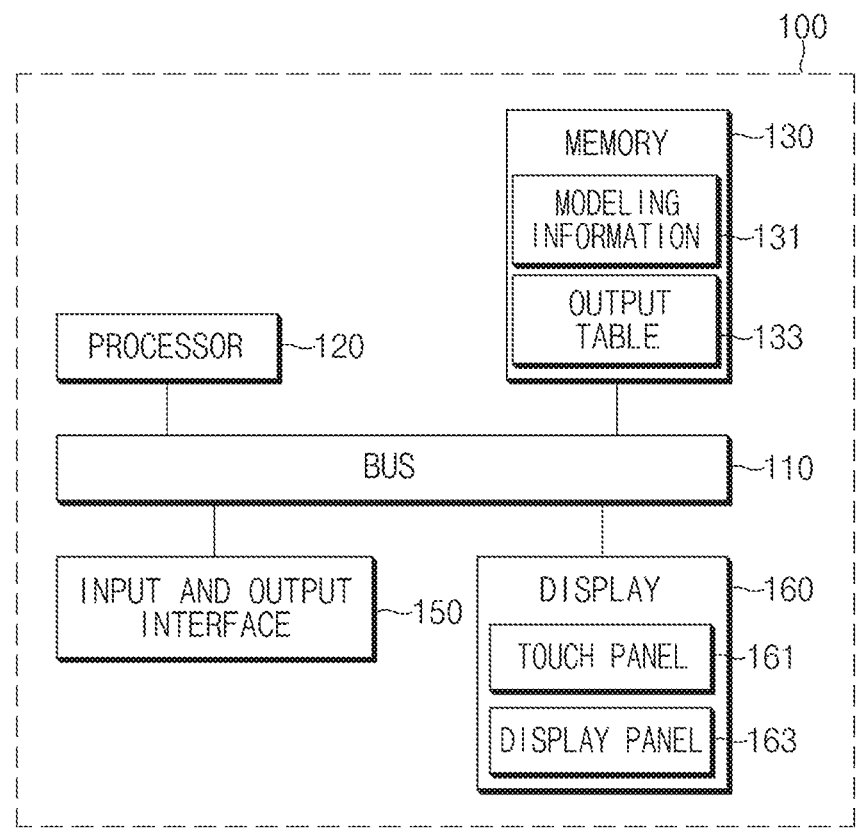
FIG. 1 is a block diagram schematically illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "have", "may have", "include", "may include", "comprise", or the like used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second", or the like used herein may modify various elements regardless of the order and/or priority thereof, and is used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" used herein may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

The terminology used herein is only used for describing specific embodiments and is not intended to limit the scope of other embodiments. The terms of a singular form may include plural forms unless otherwise specified. The terms used herein, including technical or scientific terms, have the same meanings as understood by those skilled in the art. Terms defined in general dictionaries, among the terms used herein, may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) audio layer 3 (MP3) player, a mobile medical device, a camera, and a wearable device. According to various embodiments of the present disclosure, the wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), and a bio-implantable-type device (e.g., an implantable circuit).

In various embodiments of the present disclosure, an electronic device may be a home appliance. The home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic picture frame.

In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, and an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, and a measuring instrument (e.g., a water meter, an electricity meter, a gas meter, a wave meter, or the like). In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram schematically illustrating a configuration of an electronic device according to an embodiment of the present disclosure.

Referring to FIG. 1, an electronic device 100 may include a bus 110, a processor 120 (e.g., an AP), a memory 130, an input and output interface 150, and a user interface (UI), for example, a display 160. The electronic device 100 may be implemented with, for example a portable electronic device. The portable electronic device may be implemented with, for example, a mobile phone, a smartphone, a table PC, a PDA, an enterprise digital assistant (EDA), a digital still camera, a digital video camera, a PMP, a personal navigation device or portable navigation device (PND), a handheld game console, a mobile internet device (MID), an internet tablet PC, or an electronic-book (e-book) terminal.

The electronic device 100 may output a specified object on a display panel 163 of the display 160 in response to executing a specified application. If a gesture event (e.g., a touch event or a movement event (or a motion event)) is sensed through a sensor, for example, a touch panel 161 in connection with the specified object, the electronic device 100 may collect information about a gesture input state. According to an embodiment, the electronic device 100 may collect information corresponding to an electric change (e.g., a capacitance change) associated with a form of a gesture input which approaches a specified sensor (e.g., the touch panel 161), for example, at least one of approach of a specified input tool for a specific period of time before and after a time when a touch contact occurs, contact with the input tool, and release of contact with the input tool. The electronic device 100 may detect modeling information corresponding to the collected information and may determine an input tool corresponding to the detected modeling information. The electronic device 100 may output the determined input tool and audio information adjusted based on a touch state. According to various embodiments, the determining of the input tool may be performed by a user input. In this regard, the electronic device 100 may provide a list for selecting various types of input tools. As described above, the electronic device 100 may output more realistic and sentimental audio information. According to various embodiments, a real input tool may be replaced with a specific input tool configured in a process applied to a virtual musical instrument. For example, a finger of a user of the electronic device 100 may be replaced with a stick. Also, an electronic pen of specific materials may be replaced with a violin bow.

The bus 110 may support, for example, a signal transmission system of the components of the electronic device 100. For example, the processor 120 may send a control signal to the display 160 through the bus 110. A touch event of the touch panel 161 may be sent to the processor 120 through the bus 110. Also, the processor 120 may send specified audio information to the input and output interface 150 through the bus 110.

The processor 120 may control an overall operation of the electronic device 100. According to an embodiment, the processor 120 may be implemented with an integrated circuit (IC), a system on chip (SoC), or a mobile AP. The processor 120 may compare touch state information sensed by a specified sensor, for example, the touch panel 161 with modeling information 131 and may select an input tool (e.g., a finger, a touch pen, and the like) corresponding to the compared result. The processor 120 may control an output of audio information based on a touch event with reference to an output table 133 which stores audio information configured to adjust the output in response to the selected input tool. In this operation, the processor 120 may vary at least one of a size, a frequency, and a tone of output audio information based on at least one of a touch location, a touch strength, a touch speed, a touch distance, a touch area, and a touch pressure. According to various embodiments, the processor 120 may vary at least one of a size, a frequency, and a tone of output audio information based on at least one of a location of a movement gesture, a speed of the movement gesture, a distance of the movement gesture from a sensor, a direction of the movement gesture, a change amount of the movement gesture, and a movement time of the movement gesture. According to various embodiments, the processor 120 may vary a display change of an output object based on at least one of a location, a strength, a time, a direction, an area, a speed, a change amount, and pressure of a touch. According to various embodiments, the processor 120 may vary a display change of an output object based on at least one of a location, a time, a direction, a speed, and a change amount of a movement gesture input.

The memory 130 may store at least one program associated with operating the electronic device 100 and data associated with operating the program. According to an embodiment, the memory 130 may store an operating system (OS) of the electronic device 100. Also, the memory 130 may store a sensor operation program associated with operating a specified sensor (e.g., the touch panel 161 or a sensor for sensing movement). If a gesture event (e.g., a touch event or a movement event) is generated, the sensor operation program may include an instruction set (or a routine, a function, a class, and the like) configured to collect an electric change of the touch panel 161 for a specified time before and after a time when the gesture event is generated and an instruction set configured to detect modeling information corresponding to the collected electric change.

According to an embodiment, the memory 130 may store information about a user gesture obtained through sensors such as a proximity sensor, a gesture sensor, and a gyro sensor. Also, the memory 130 may include an instruction set configured to collect the gesture change and an instruction set configured to detect modeling information corresponding to the collected gesture change. According to an embodiment, the gesture may be generated based on sensor information obtained from an external device or an external sensor operatively connected with the electronic device 100. According to another embodiment, the electronic device 100 may perform a motion, associated with a function of playing a virtual musical instrument, based on a voice or physiological information of the user of the electronic device 100 other than the gesture.

Also, the memory 130 may include an instruction set configured to select an input tool corresponding to detected modeling information, an instruction set configured to determine a characteristic of audio information to be output, based on the selected input tool and a touch state, and an instruction set configured to output the audio information of the determined characteristic.

The memory 130 may include the modeling information 131 referenced to select an input tool based on execution of the sensor operation program and the output table 133 referenced in connection with outputting audio information of a specified characteristic. The modeling information 131 may include, for example, information in which electric change values associated with at least one input tool which approaches the touch panel 161 and provides an electric change are modeled. For example, the modeling information 131 may include modeling information corresponding to an electric change based on approach of a finger of the user, modeling information corresponding to an electric change based on approach of a touch pen, modeling information corresponding to an electric change based on approach of a specified object which may provide the electric change, and the like. According to various embodiments, the modeling information 131 may include modeling information corresponding to an electric change based on approach of a touch pen of materials with hard properties, modeling information corresponding to an electric change based on approach of a touch pen of materials with soft properties, and the like. According to various embodiments, the modeling information 131 may include modeling information based on a movement gesture. For example, the modeling information 131 may include a plurality of modeling information mapped to different models based on a specified movement direction, a movement location, a movement speed, a distance between a sensor and movement occurrence, a movement change amount, a movement time, and the like. For example, the modeling information 131 may include model information corresponding to a stroke movement, model information corresponding to a movement of stroking the keys of a piano, model information corresponding to movement of blowing a horn, model information corresponding to a movement of playing strings of a string instrument, model information corresponding to a movement of playing a drum, and the like. According to various embodiments, the electronic device 100 may measure unique capacitance of an object or finger with conductivity and may model the measured capacitance as a tool of a specific musical instrument. According to an embodiment, assuming that a real finger of an adult as a drumstick, the electronic device 100 may model a maximum value of the drumstick as a strength of 10 phi.

The output table 133 may include characteristic values of audio information to be output by input tools mapped to modeling information. For example, if an input tool is selected as a finger in a state where a specified object is output, the output table 133 may include characteristic values configured to output at least one of a level, a frequency, and a tone of audio information, which may be provided by the corresponding object, in a different way in response to at least one of a touch strength, a touch location, a touch change speed, and a touch distance of the finger. Therefore, at least one of a level, a frequency, and a tone of audio information output by a location, a strength, a time, a direction, an area, a speed, and a pressure, touched by the finger may be output in a different way in the state where the specified object is output. According to various embodiments, the output table 133 may include information configured to output a virtual musical instrument mapped to a specified movement, audio information to be output based on a specific movement in a state where a specified virtual musical instrument is output, and the like. According to an embodiment, a size, a tone, a sound effect, or duration, and the like of audio information by a pattern, a motion or movement, a speed, a direction, a strength, or a size, and the like of a gesture of the user may be output in a different way.

According to various embodiments, the output table 133 may have a characteristic value configured to output different audio information with respect to an input tool for each object. For example, the output table 133 may have a characteristic value configured to output audio information corresponding to a first touch input by a first input tool in a state where a first object is output and audio information corresponding to a second touch input by a second input tool in a state where the first object is output in a different way.

The input and output interface 150 may play a role as, for example, an interface which may send a command or data, input from the user or another external device, to another component (other components) of the electronic device 100. Also, the input and output interface 150 may output a command or data, received from another component (other components) of the electronic device 100, to the user or the other external device. The input and output interface 150 may include, for example, at least one physical button or touch button, a touch pad, or a touch screen, and the like. Also, the input and output interface 150 may include an input means by an electronic pen and the like. Also, the input and output interface 150 may include an audio collection device which may collect an audio signal. According to an embodiment, the input and output interface 150 may include an audio output device (e.g., a speaker, a sound interface, and the like) which outputs audio information configured in connection with operating a specified object. The audio output device may output, for example, audio information of a different tone or level based on at least one of a type, a touch strength, a touch location, a touch change speed, and a touch distance of an input tool which touches an object, in a state where a specified object is displayed.

The display 160 may include the touch panel 161 and the display panel 163. The display panel 163 may be implemented with a thin film transistor-liquid crystal display (TFT-LCD) panel, a light emitting diode (LED) panel, an organic LED (OLED) panel, an active matrix OLED (AMO-LED) panel, or a flexible panel. The display panel 163 may output an execution screen based on executing a specified application. For example, the display panel 163 may output a specified object in connection with executing the specified application. According to various embodiments, the display panel 163 may display a menu screen for selecting at least one object (e.g., a musical instrument). The display panel 163 may output an object corresponding to a specific musical instrument, or may change an output object to a different type of object and may display the changed object, based on a user input or a user setting. Alternatively, the display panel 163 may display objects corresponding to a plurality of musical instruments.

The touch panel 161 may periodically receive a scan signal and may collect an electric change (e.g., a capacitance change) based on approach of a touch object (or an input tool). The touch panel 161 may send the collected electric change to the processor 120.

Figure 2A:
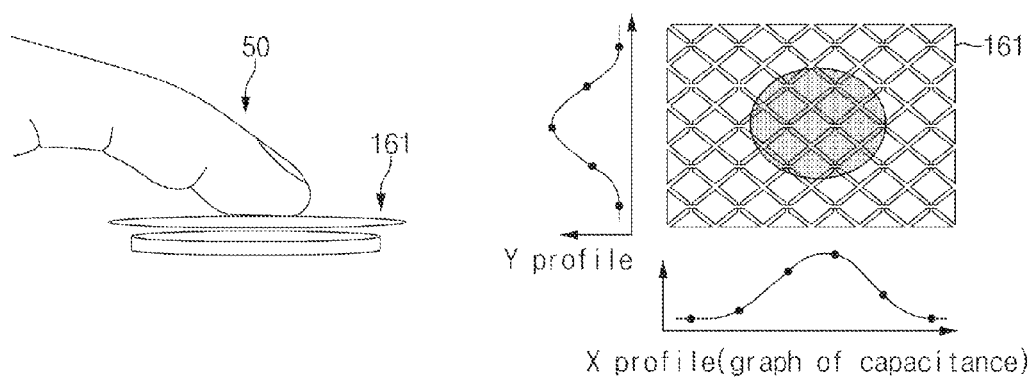
FIG. 2A is a drawing illustrating a touch panel state based on contact with an input tool according to an embodiment of the present disclosure.

FIG. 2A is a drawing illustrating a touch panel state based on contact with an input tool according to an embodiment of the present disclosure.

Referring to FIG. 2A, if a finger 50 is in contact with a touch panel 161, as shown in FIG. 2A, a capacitance change may occur on an X-axis profile and a Y-axis profile of the touch panel 161. For example, the touch panel 161 may detect a relatively higher capacitance change on a central portion which is in contact with the finger 50 and may detect a relatively lower capacitance change when it is more distant from the central portion which is in contact with the finger 50. Therefore, the touch panel 161 may calculate a contact point, a strength, and the like which are in contact with the finger 50, based on a capacitance change on a two dimension calculated by the X-axis profile and the Y-axis profile. According to an embodiment, the touch panel 161 may calculate a strength, in which a user of an electronic device pushes the touch panel 161, based on an X- and Y-axis profiling area. For example, if the user pushes hard on the touch panel 161, since an area which is in contact with the finger 50 is larger from the central point which is in contact with the finger 50, capacitance changes in the central point and an outpour portion may be smaller than if he or she pushes lightly on the touch panel 161. According to an embodiment, the touch panel 161 may calculate a touch strength of the user based on capacitance changes in the central point and the outer portion, and its size.

Figure 2B:
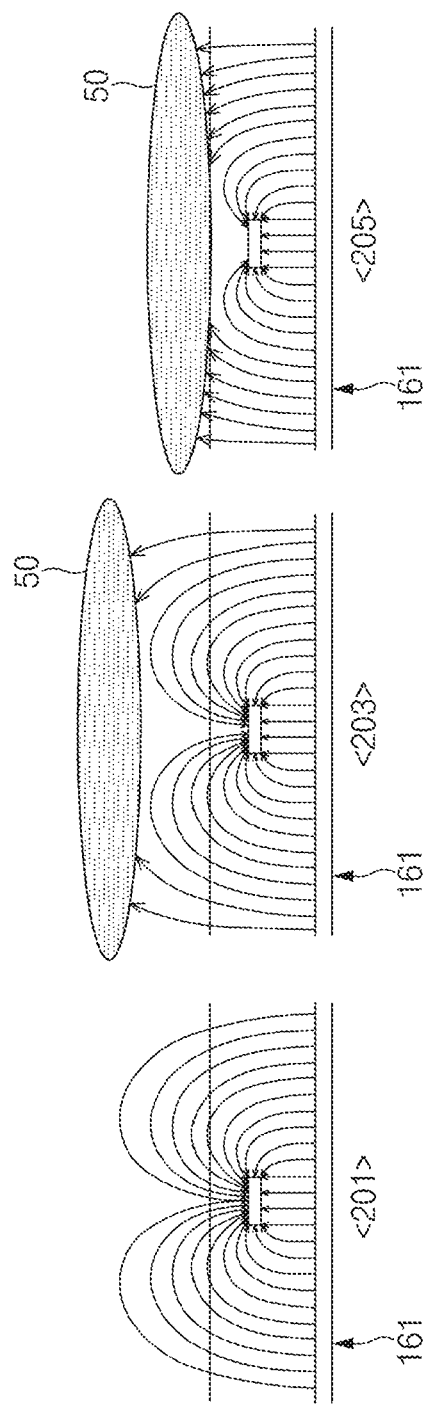
FIG. 2B is a drawing illustrating modeling based on touch recognition of a touch panel according to an embodiment of the present disclosure.

FIG. 2B is a drawing illustrating modeling based on touch recognition of a touch panel according to an embodiment of the present disclosure.

Referring to FIG. 2B, in state 201, as shown in FIG. 2B, a touch panel 161 may not detect an electric change in a situation where there is no approach of an input tool (e.g., a touch object which may generate an electric change of the touch panel 161). For example, if there is no approach of the input tool, the touch panel 161 may detect the same capacitance as a previous state (or an initial state) from a plurality of points for recognizing a touch.

In state 203, if the input tool (e.g., a finger) approaches in the direction of a certain point (e.g., a point of forming certain capacitance) of the touch panel 161 and is in a hovering state, as shown in FIG. 2B, the touch panel 161 may detect an electric change of a first level. For example, the touch panel 161 may detect a region where relatively smaller capacitance is detected than a previous state.

In state 205, if the input tool is in contact with a certain point of the touch panel 161, as shown in FIG. 2B, the touch panel 161 may detect an electric change of a second level. For example, the touch panel 161 may detect a region where relatively smaller capacitance is detected than state 203.

According to various embodiments, the touch panel 161 may detect change amounts of states 201 to 205. For example, if an input tool with a certain shape approaches a surface of the touch panel 161, an electric change detected on the touch panel 161 may vary based on the shape of the input tool. According to an embodiment, an electronic change amount in a finger approach state may be different from an electric change amount in a touch pen approach state. An electronic device 100 of FIG. 1 may detect an electric change as input tools approach the touch panel 161 and are then in contact with the touch panel 161, may model the detected electric change, and may store the modeled information in a memory 130 of FIG. 1. In connection with collecting modeling information, the electronic device 100 may provide a modeling generation function. For example, the electronic device 100 may provide a modeling correction function of a nonregistered input tool or a registered input tool through a specific menu item and the like. If the modeling generation function is executed, the electronic device 100 may provide an item for inputting an input tool name and may provide a screen interface for an input point to be touched by an input tool. The electronic device 100 may collect an electric change amount based on approach of an input tool a specified number of times, may perform an equalization task (or an average task and the like) for the collected electric change amounts, and may generate modeling information about a specific input tool or may correct previously registered modeling information. According to various embodiments, the electronic device 100 may receive modeling information based on an electric change for each input tool from an external electronic device or a server device and may store the received modeling information in the memory 130.

According to various embodiments, an electronic device may include a UI configured to output at least one specified object corresponding to a virtual musical instrument and to receive an event based on touch of the at least one specified object, a memory configured to store modeling information associated with an input tool which touches the at least one specified object, and a processor configured to electrically connect to the UI and the memory. The memory may store instructions configured to, when executed, cause the processor to select an input tool based on modeling information corresponding to an electric change by a touch, to adjust a characteristic of an output audio in response to a type of the input tool and the touch state, and to output the adjusted audio.

According to various embodiments, the memory may store instructions configured to, when executed, cause the processor to select a type of an input tool based on at least one of a capacitance change in a hovering state, a touch area, a touch area change, and an electric change by a touch for a specified time before and after a time when a touch contact occurs.

According to various embodiments, the memory may store instructions configured to, when executed, cause the processor to detect a touch strength based on at least one of the touch area, the touch area change, and the electric change by the touch.

According to various embodiments, the memory may store instructions configured to, when executed, cause the processor to output a level of the audio or audio output duration in a different way based on a level of the touch strength.

According to various embodiments, the memory may store instructions configured to, when executed, cause the processor to output a display change amount of an object based on at least one of the touch strength, a touch location, and a type of the input tool.

According to various embodiments, the memory may store instructions configured to, when executed, cause the processor to display a display change amount of the object to be relatively larger if the touch strength is greater than or equal to a specific level and to display a display change amount of the object to be relatively smaller if the touch strength is less than the specified level.

According to various embodiments, the memory may store instructions configured to, when executed, cause the processor to output a tone or a frequency of the audio in a different way in response to a touch location on the object.

According to various embodiments, the memory may store instructions configured to, when executed, cause the processor to output an output level of the audio in a different way in response to a touch location on the object.

According to various embodiments, the memory may store instructions configured to, when executed, cause the processor to output the audio by mapping a capacitance level to a force applied to strings of a virtual string instrument, mapping a touch area to an area which is in contact with strings of the virtual string instrument, and mapping a touch speed to a speed of playing strings of the virtual string instrument or playing the virtual string instrument.

According to various embodiments, the memory may store instructions configured to, when executed, cause the processor to output the audio by mapping a capacitance level to a force applied to one side of a virtual rotatory input musical instrument and mapping a touch speed to a performance speed of the virtual rotatory input musical instrument.

According to various embodiments, an electronic device may include a memory configured to store modeling information associated with an input tool which touches a specified object and a processor configured to electrically connect to the memory. The processor may select an input tool based on modeling information corresponding to an electric change by a touch, may select an audio corresponding to a type of the input tool, may adjust a characteristic of the selected audio in response to a touch form, and may output the adjusted audio.

According to various embodiments, an electronic device may include a touch screen interface (or a touch screen display), a speaker, a sound interface, a processor configured to electrically connect to the touch screen display, the speaker, and the sound interface and a memory configured to electrically connect to the processor, wherein the memory stores instructions for, when executed, causing the processor to: display at least one item of a musical instrument shape on the touch screen display, receive a touch input through the touch screen display, load sound data corresponding to the at least one item based on the touch input, process the sound data based on at least part of information associated with the touch input and output the processed sound data through the speaker or the sound interface.

According to various embodiments, the information comprises at least one of a location, a strength, a time, a direction, an area, a speed, and a pressure of the touch input.

According to various embodiments, the memory may store instructions configured to, when executed, cause the processor to change the at least one displayed item based on at least part of the information associated with the touch input and display the at least one changed item on the touch screen display.

According to various embodiments, the electronic device comprises a display, a speaker, a sound interface, a processor configured to electrically connect to the display, the speaker, and the sound interface and a memory configured to electrically connect to the processor, wherein the memory stores instructions for, when executed, causing the processor to: obtain a gesture of a user of the electronic device through at least one sensor operatively connected with the electronic device, output sound data corresponding to at least one musical instrument through an output device operatively connected with the electronic device, if the gesture is a gesture corresponding to at least one musical instrument and not output the sound data, if the gesture is a gesture which does not correspond to the at least one musical instrument.

According to various embodiments, the memory may store instructions configured to, when executed, cause the processor to output the sound data while changing at least part of properties of the sound data based on at least properties of the gesture.

According to various embodiments, the memory may store instructions configured to, when executed, cause the processor to display an item corresponding to the at least one musical instrument through a display operatively connected with the electronic device, and wherein the processor to display a region corresponding to at least one sound of the item based on at least properties of the gesture, the region being actually pushed.

According to various embodiments, the at least one musical instrument comprises a first musical instrument and a second musical instrument, wherein the at least one sound comprises a first sound and a second sound, and wherein the gesture corresponds to the first musical instrument.

According to various embodiments, the memory may store instructions configured to, when executed, cause the processor to obtain another gesture and output the second sound, if the other gesture is a gesture corresponding to the second musical instrument.

According to various embodiments, the first sound (or the second sound) is output concurrently with at least part of the second sound (or the first sound).

According to various embodiments, the memory may store instructions configured to, when executed, cause the processor to display a first item corresponding to the first musical instrument concurrently with a second item corresponding to the second musical instrument during at least part of a time.

According to various embodiments, the electronic device further comprises a first display and a second display, wherein the processor is configured to displays the first item through the first display and displays the second item through the second display.

Figure 3:
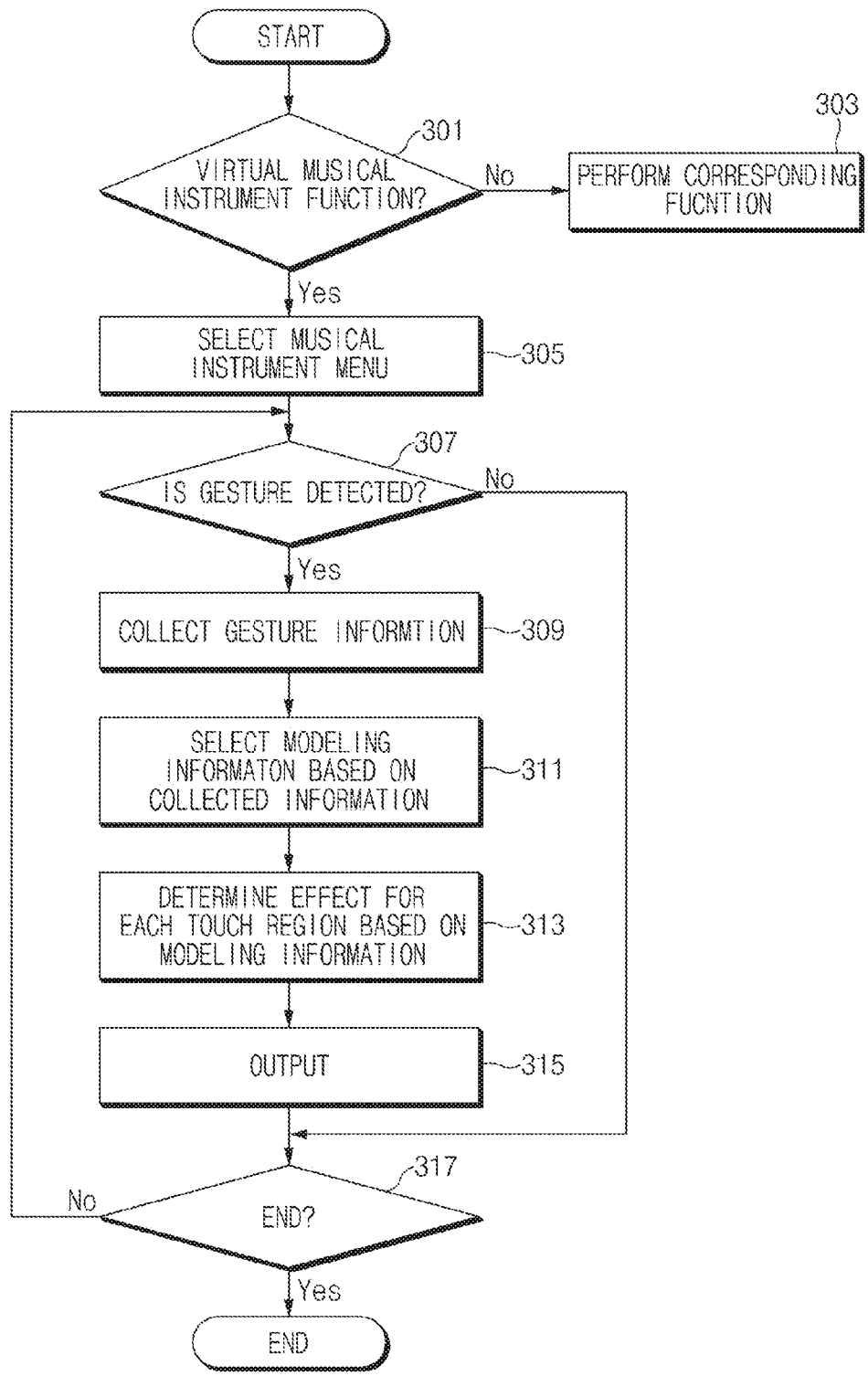
FIG. 3 is a flowchart illustrating a playing gesture method of a virtual musical instrument according to an embodiment of the present disclosure.

FIG. 3 is a flowchart illustrating a playing gesture method of a virtual musical instrument according to an embodiment of the present disclosure.

Referring to FIG. 3, in a touch processing method according to an embodiment, if an event is generated, in operation 301, a processor 120 of an electronic device 100 of FIG. 1 may determine whether the generated event is an event associated with executing a virtual musical instrument function. If the generated event is not the event associated with executing the virtual musical instrument function, in operation 303, the processor 120 may perform a corresponding function based on a type of the generated event. For example, the processor 120 may perform a file editing function, a file search function, a web surfing function, and the like based on the type of the event.

If the generated event is the event associated with executing the virtual musical instrument function, in operation 305, the processor 120 may perform a function of selecting a musical instrument menu. The function of selecting the musical instrument menu may be to provide, for example, an item corresponding to each of a virtual piano, a virtual violin, a virtual drum, and a virtual guitar to select at least one of the virtual piano, the virtual violin, the virtual drum, and the virtual guitar. According to various embodiments, if the virtual musical instrument function is to provide only a specific virtual musical instrument based on a default setting, operation 305 may be omitted.

If the virtual musical instrument is selected, in operation 307, the processor 120 may determine whether a touch panel 161 of FIG. 1 detects a touch. If the touch is not detected, the processor 120 may branch to operation 317 and may perform the operation again from operation 317. If the touch is detected, in operation 309, the processor 120 may collect at least one of a touch strength and a touch area. In this operation, the processor 120 may collect information about an electric change of the touch based on the touch strength or the touch area and the like which occur in the touch situation. The touch strength may be determined by, for example, a touch area change, a touch area change speed, an electric change speed by the touch, and the like. According to an embodiment, if detecting a relative larger touch area from the same input tool, the processor 120 may recognize an occurrence of a relatively higher touch strength. Also, if an electric change speed by the touch is relatively faster, the processor 120 may recognize an occurrence of a relatively higher touch strength.

In operation 311, the processor 120 may select modeling information (e.g., modeling information 131 of FIG. 1) based on the information collected in operation 309. For example, the electronic device 100 may select modeling information corresponding to the collected information about the electric change of the touch. According to an embodiment, the electronic device 100 may first select modeling information with the same or similar touch area (e.g., a finger, a touch pen having a pen point of a specified size, and the like) and may select modeling information with a similar touch strength among the first selected modeling information.

In operation 313, the processor 120 may determine an output effect for each touch region based on the modeling information. According to an embodiment, if modeling information is selected, the processor 120 may select a type of an input tool (e.g., a finger, a touch pen, and the like) corresponding to the modeling information. Also, the processor 120 may refer to an output characteristic value corresponding to the input tool from an output table 133 of FIG. 1. The processor 120 may select a characteristic value to be output in response to a currently generated touch state as an output effect with reference to the output characteristic value.

In operation 315, the processor 120 may output audio information based on the output effect (e.g., a volume level and the like). For example, the processor 120 may generate audio information corresponding to a touch strength and a touch area by applying the output effect in an operation of touching a selected virtual musical instrument using a selected input tool. The electronic device 100 may output the generated audio information.

In operation 317, the processor 120 may determine whether an event associated with ending the virtual musical instrument function is generated. For example, the processor 120 may determine whether an event associated with ending the virtual musical instrument function or an application associated with a virtual musical instrument. If the event associated with ending the virtual musical instrument is not generated, the electronic device 100 may branch to operation 307 and may perform the operations again from operation 307. If the event associated with ending the virtual musical instrument is generated, the electronic device 100 may end the virtual musical instrument function and may branch to a specified state (e.g., a home screen or a state before the virtual musical instrument function is executed).

Figure 4:
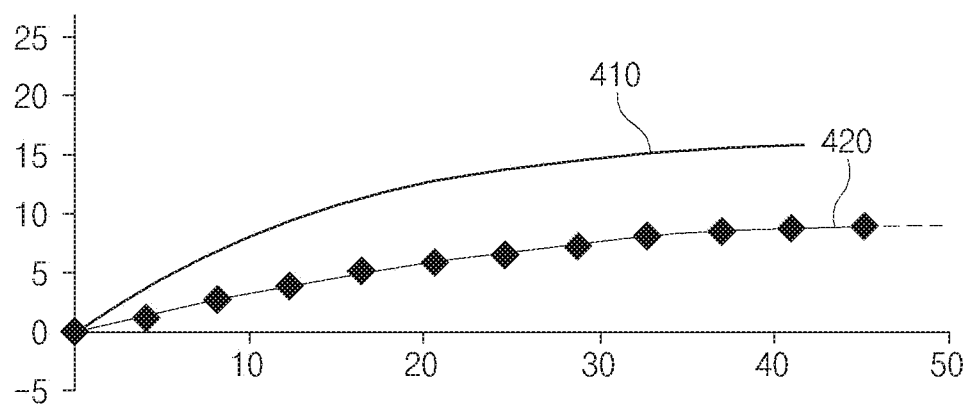
FIG. 4 is a drawing illustrating sound pressure scaling according to an embodiment of the present disclosure.

FIG. 4 is a drawing illustrating sound pressure scaling according to an embodiment of the present disclosure.

Referring to FIG. 4, an electronic device 100 of FIG. 1 may determine a specified sound pressure in response to a change in capacitance. For example, the electronic device 100 may calculate a sound pressure corresponding to capacitance using Equation 1 below.

$$R=-0.0039H2+0.3754H-0.1279 \qquad \text{Equation 1}$$

Herein, H represents a capacitance value, and R represents a sound pressure. A graph corresponding to corresponding Equation 1 is represented by reference numeral 410. Assuming that a real finger of an adult is a stick of a drum, if a maximum value of the stick is modeled as a strength of 10 phi, in FIG. 4, a sound pressure curve (reference numeral 420 of FIG. 4) may be represented by a line of connecting diamond shapes. In addition, the electronic device 100 may provide a function of adjusting an effect based on a played environment setup as a given function. For example, the electronic device 100 may provide a studio environment setup item. If the corresponding item is selected, the electronic device 100 may relatively more strengthen a parameter value of a bass musical instrument on the sound pressure curve in FIG. 4 based on a user input associated with the selected item. Also, the electronic device 100 may provide an outdoor background environment setup item. If the corresponding item is selected, the electronic device 100 may boost up levels of a white noise and a strength of a sound pressure by a specified level by adding an outdoor parameter to a modeled value and may output the boosted-up audio. In FIG. 4, a portion represented by a dotted line may indicate a boosted-up region based on an environment setup change.

Figure 5A:
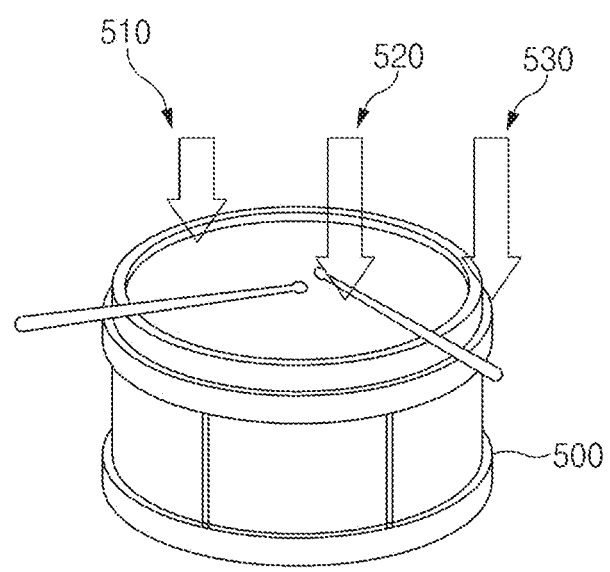
FIG. 5A is a drawing illustrating a screen interface associated with an output change based on a gesture location according to an embodiment of the present disclosure.

FIG. 5A is a drawing illustrating a screen interface associated with an output change based on a gesture location according to an embodiment of the present disclosure.

Referring to FIG. 5A, for example, an electronic device 100 of FIG. 1 may output a specified object 500 (e.g., an item of a musical instrument shape) on a display 160 of FIG. 1. The specified object 500 may be, for example, an object of a drum shape. The object 500 may include, for example, a central portion, an outer portion, and a rim case. According to an embodiment, the item of the musical instrument shape may be configured with at least one or more items. For example, the item of the musical instrument shape may be configured with an item including a plurality of musical instruments or accessories of a musical instrument. According to an embodiment, the item of the musical instrument shape may be configured with a plurality of images. For example, the item of the musical instrument shape may be configured with the plurality of images and may display a movement, a motion, vibration, a focus, and the like of a musical instrument. The electronic device 100 may change a modeling value based on a location of a gesture input (e.g., a touch input, a movement input, a motion input, and the like). For example, if the gesture input is a touch input, the electronic device 100 may adjust audio information to be output based on a touch input which occurs on the central portion of the object 500, audio information to be output based on a touch input which occurs on the outer portion of the object 500, and audio information to be output based on a touch input which occurs on the rim case in a different way. According to an embodiment, if the gesture input corresponds to a specified motion or movement input, the electronic device 100 may determine the motion or movement input and may display a musical instrument associated with the motion or movement input.

According to an embodiment, the electronic device 100 may obtain a gesture (e.g., a movement or motion) of the user from at least one sensor (e.g., a gesture sensor, a camera module, and the like) operatively connected with the electronic device 100 or external sensors operatively connected through a communication module of the electronic device 100. The electronic device 100 may adjust the musical instrument or audio information associated with the musical instrument in a different way based on the obtained user gesture.

According to an embodiment, the electronic device 100 may obtain a touch input of the user, a movement (e.g., a hand motion) of the user, and the like as gesture inputs. For example, the electronic device 100 may determine a gesture movement of a hand of the user, input on a three-dimensional (3D) space. According to an embodiment, the electronic device 100 may detect a movement gesture (or a motion pattern or a movement speed) of a hand of the user using a camera, an acceleration sensor, and the like operatively connected to the electronic device 100 and may provide a scale or tone corresponding to a musical instrument based on the detected movement gesture, motion pattern, or movement speed. For example, if the user moves his or her hand fast on a virtual musical instrument item, the electronic device 100 may provide a more acute tone when a gesture speed of the movement is faster. In contrast, when the gesture speed of the movement is slower, the electronic device 100 may provide a graver tone.

According to an embodiment, the electronic device 100 may change an image of the musical instrument shape to a musical instrument associated with the obtained user gesture. For example, if the user takes a gesture of playing the guitar, the electronic device 100 may recognize the gesture of the user, which plays the guitar and may display an item of a guitar shape. The electronic device 100 may periodically recognize a change of the user gesture and may replace an image of a musical instrument shape associated with the user gesture. According to an embodiment, if the gesture of the user is a gesture of striking the keys of a piano, the electronic device 100 may display an image of a piano shape. If the user takes a gesture of playing the flute, the electronic device 100 may display a flute image. If the user takes a gesture of playing the drum, the electronic device 100 may display the drum. The electronic device 100 may change an image based on a gesture change. According to an embodiment, the electronic device 100 may allow one user to play or execute various musical instruments in a multiple way through various gestures.

The electronic device 100 may change an image of a musical instrument shape based on a gesture of the user and may output the changed image. The electronic device 100 may change at least part of properties of sound data associated with the musical instrument based on properties (e.g., a speed, a level, a distance from the electronic device 100, a time, a location, and a pressure) of the gesture and may output the changed sound data.

According to an embodiment, the gesture may include a touch, hovering, a gesture on space, a movement of the electronic device 100, a motion, or a voice through the user or a pen.

According to an embodiment, the electronic device 100 may provide a different sound effect based on a gesture input (e.g., touch or gesture motion recognition) obtained based on a location of an image of the object 500 of the musical instrument shape. For example, if receiving an input on a middle location 520 of the object 500 of the drum shape from the user through a gesture input (e.g., a touch or a motion gesture), the electronic device 100 may output a maximum sound set in the object 500 based on a touch or gesture which occurs on the location 520. The electronic device 100 may output a sound with a relatively lower sound pressure than a sound in the location 520 in response to a touch which occurs on a location 510. According to various embodiments, the electronic device 100 may output a sound which has a lower sound pressure and a different tone from the sound in the location 520 in response to a touch or gesture which occurs on a location 530. In this regard, the electronic device 100 may change modeling values for each portion of the object 500.

Figure 5B:
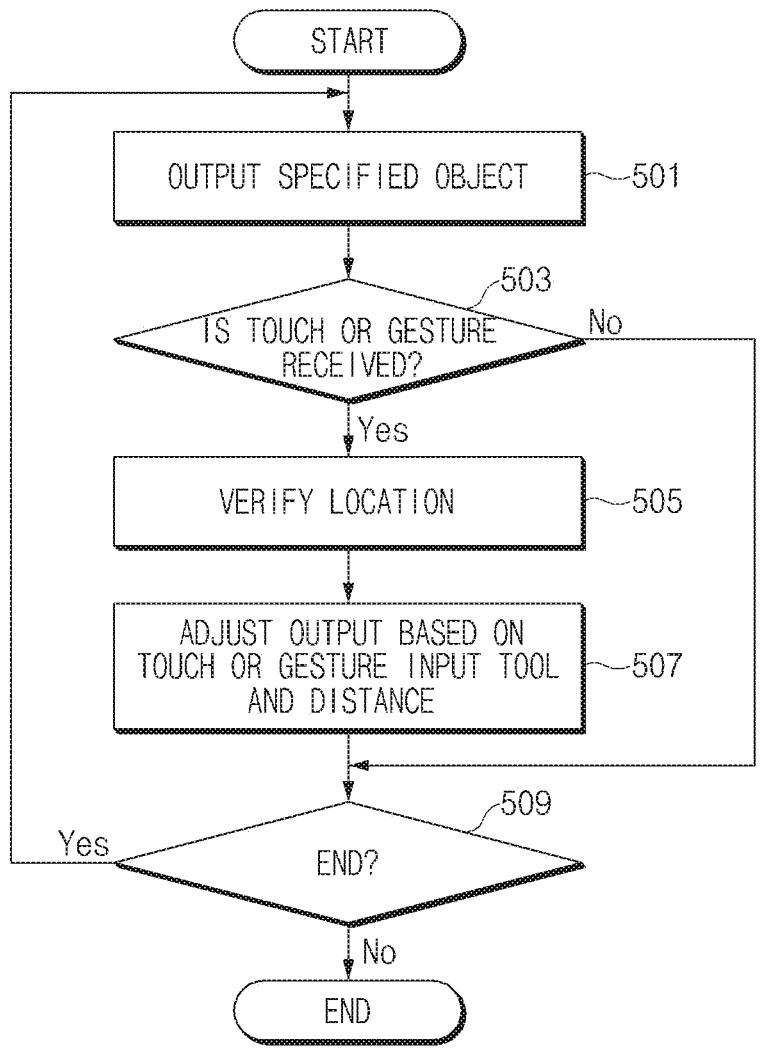
FIG. 5B is a flowchart illustrating a method for playing a virtual musical instrument for each location of a gesture input (e.g., a touch or motion input) according to an embodiment of the present disclosure.

FIG. 5B is a flowchart illustrating a method for playing a virtual musical instrument for each location of a gesture input (e.g., a touch or motion input) according to an embodiment of the present disclosure.

Referring to FIG. 5B, in operation 501 of the method for playing the virtual musical instrument, an electronic device 100 of FIG. 1 may output a specified object configured to change an output based on a state of a gesture (e.g., a touch or movement). For example, the electronic device 100 may output the specified object based on a default setting in response to a request to execute a virtual musical instrument or may output an object corresponding to user selection on a display 160 of FIG. 1.

In operation 503, the electronic device 100 may determine whether a gesture (e.g., a touch or movement) is received. If the gesture is not received, the electronic device 100 may branch to operation 509 to perform the operations from operation 509. If the gesture (e.g., the touch or movement) is received, in operation 505, the electronic device 100 may verify a location of the gesture. If the gesture is received, the electronic device 100 may select an input tool corresponding to a state of the gesture using modeling information 131 of FIG. 1. According to an embodiment, the gesture may be obtained through an external device or an external sensor operatively connected with the electronic device 100. According to an embodiment, the electronic device 100 may receive a gesture input (e.g., a touch or movement input) generated through a wearable device (e.g., a watch phone) worn by its user and may verify occurrence of a gesture.

In operation 507, the electronic device 100 may adjust an output based on a gesture input too and a location. For example, the electronic device 100 may select a tone, provided by the specified object, in response to the gesture input tool. Alternatively, the electronic device 100 may select a level of a sound to be output in response to a strength, a speed, a pressure, a direction, a change amount, and an area of a gesture input (e.g., a touch or movement input). Alternatively, the electronic device 100 may select a variation level of a sound to be output, in response to a touch location. The electronic device 100 may obtain at least one of a strength, a speed, a pressure, a direction, a change amount, and an area of the gesture based on a touch sensor, an acceleration sensor, a speed sensor, an infrared sensor, a camera sensor, an acoustic sensor, or a proximity sensor, and the like which are included in the electronic device 100. For example, if the gesture is a touch gesture, the electronic device 100 may obtain information associated with a touch area, a touch strength, a touch size, a touch direction, and the like through a touch sensor or a touch panel. If the gesture is a movement (or a motion), the electronic device 100 may obtain a motion of the user through a camera sensor operatively connected with the electronic device 100 and may determine at least one of a strength, a speed, and a direction based on a size change of the movement based on the obtained information. For example, if the user performs a motion of playing a musical instrument (e.g., a drum), the electronic device 100 may recognize the motion of the user through a camera operatively connected with the electronic device 100 and may calculate a speed and the like of the motion for the user to play the drum.

According to an embodiment, if the user uses a wearable device and an electronic device connected with the wearable device, the electronic device may display a musical instrument and may receive a motion for controlling the musical instrument displayed on the electronic device through the wearable device. For example, if the electronic device displays a plano, the user may generate a gesture input (e.g., a touch or movement input) on the wearable device and may play the plano displayed on the electronic device. In this case, the wearable device may send the gesture input obtained by the wearable device to the electronic device. According to an embodiment, a plurality of wearable devices may connect to the electronic device. The plurality of wearable devices may recognize a gesture (e.g., a touch or movement) of the user and may send the recognized gesture (e.g., the recognized touch or movement) to the electronic device to play a musical instrument displayed on the electronic device.

According to various embodiments, although the user touches the same object using the same touch strength and the same area, the electronic device 100 may output a sound having a different tone or level based on a touch location. When the touch input tool is selected, the electronic device 100 may select a real input tool (e.g., a finger) or may select another input tool (e.g., a stick or pick and the like configured to execute a virtual musical instrument) replaced with the real input tool.

According to various embodiments, the electronic device 100 may trace a finger movement of the user in a hovering state, and may display an input tool (e.g., a stick and pick) in real time or may display an image effect based on a movement state. For example, the electronic device 100 may recognize a hand motion, after the user picks a real guitar when he or she plays the guitar, as a hovering motion. The electronic device 100 may continue providing a sound effect associated with the recognized hovering motion or may change the sound effect.

In operation 509, the electronic device 100 may determine whether a function end event is generated. If the function end event is not generated, the electronic device 100 may branch to operation 501 to perform the operations again from operation 501. If the function end event is generated, the electronic device 100 may end an output adjustment function associated with the output object and may branch to a specified state (e.g., a sleep state, a home screen, a state where a just previous function is executed, and the like).

Figure 6A:
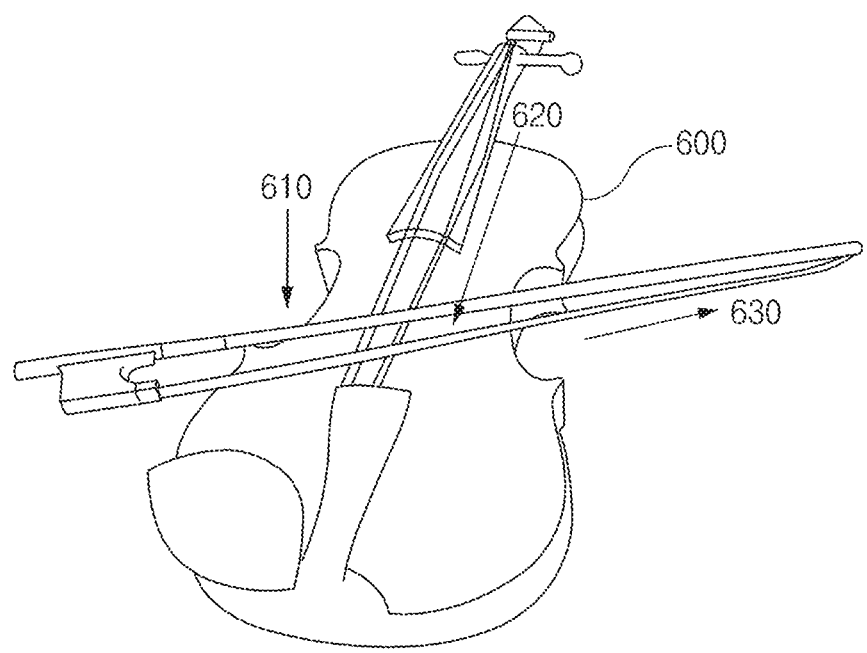
FIG. 6A is a drawing illustrating a screen interface associated with an output change based on a change of a gesture input according to an embodiment of the present disclosure.

FIG. 6A is a drawing illustrating a screen interface associated with an output change based on a change of a gesture input according to an embodiment of the present disclosure.

Referring to FIG. 6A, an electronic device 100 of FIG. 1 may output a specified object 600 in response to executing a virtual musical instrument function. The object 500 may be, for example, a virtual object corresponding to a cello (or a string instrument such as a violin, a viola, or a contrabass). To play the string instrument, the electronic device 100 may output a bow on a certain location of the object 600. The electronic device 100 may be in a state of lightly holding the bow or a state of strongly holding the bow, and the like based on a location, a strength, an area, a pressure, a motion pattern (or a movement pattern), a speed, a direction, or a change amount, and the like of a touch or gesture of selecting the bow. Also, the electronic device 100 may be in a state of slowly playing strings or a state of quickly playing strings, and the like based on a movement speed of the bow. The electronic device 100 may generate modeling information corresponding to an input state of a gesture (or a touch or movement) associated with the bow and may output a different sound based on a state value of the gesture (e.g., the touch or movement).

According to an embodiment, if a user of the electronic device 100 generates a gesture input (e.g., a touch or movement input) on a location 610 and if he or she plays strings at a first speed, the electronic device 100 may output a sound with a relatively low sound pressure. If the user generates a gesture input (e.g., a touch or movement input) on a location 620 and if he or she plays the strings at the first speed, the electronic device 100 may output a sound with a relatively higher sound pressure than the sound in the location 610.

According to an embodiment, the electronic device 100 may recognize a plurality of gestures and may combine or connect at least some of the plurality of gestures to generate a specific sound effect. For example, the electronic device 100 may obtain a gesture movement after a touch motion and may link the touch motion with the gesture movement to provide a sound effect in a different way. For example, the electronic device 100 may a sound effect of the musical instrument in a different way based on a form in which the user plays the bow (e.g., a gesture of playing the bow up, a gesture of strongly playing the bow up and down, a gesture of weakly playing the bow up and down, or a gesture of slowly or quickly playing the bow in a specific direction) after he or she touches the bow on the location 610. According to various embodiments, if the user generates a touch on a location 630 and if he or she plays strings at a second speed, the electronic device 100 may output a sound which has a relatively higher sound pressure than the sound in the location 610 and is higher than the sound in the location 610. As described above, the electronic device 100 may apply a level of capacitance by a touch to a level of a force applied to the bow and may apply a touch speed to a level of a sound. Therefore, the electronic device 100 may generate various effects in one scale other than a unique scale value, based on a strength in which the played bow is pushed to strings, an area where the bow is in contact with strings, and a speed at which the user plays the bow.

Figure 6B:
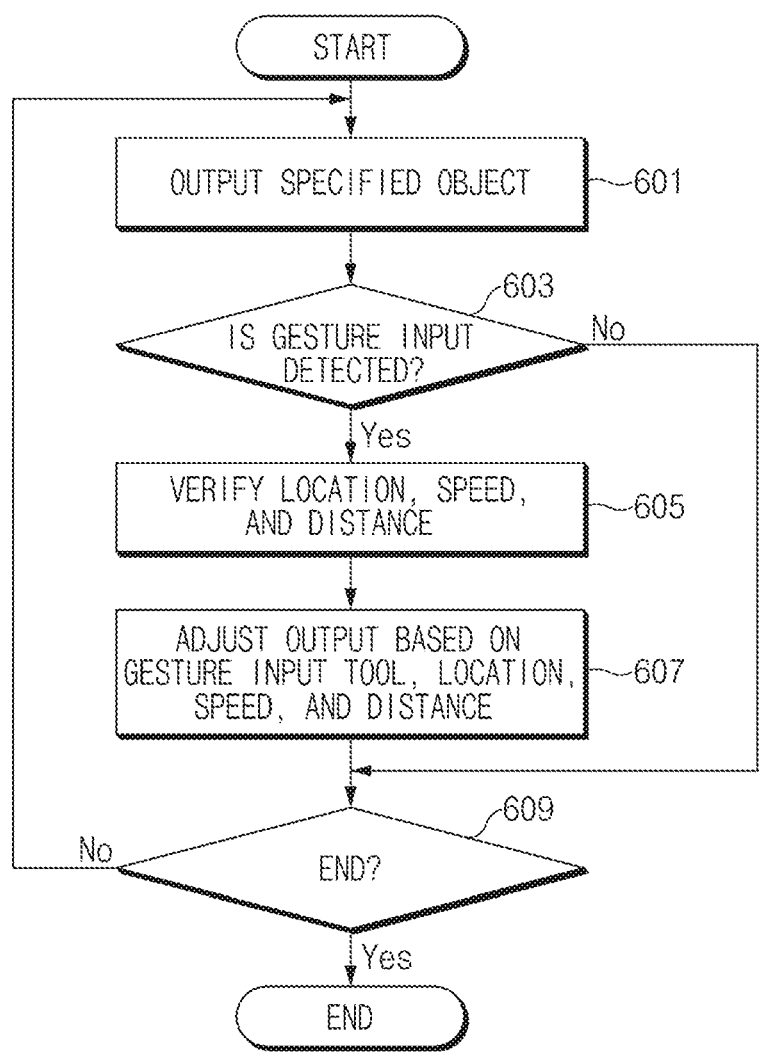
FIG. 6B is a flowchart illustrating a method for processing a gesture input based on a change of the gesture input according to an embodiment of the present disclosure.

FIG. 6B is a flowchart illustrating a method for processing a gesture input based on a change of the gesture input according to an embodiment of the present disclosure.

Referring to FIG. 6B, in operation 601 of the method for playing the virtual musical instrument, an electronic device 100 of FIG. 1 may output a specified object. The specified object may be an object corresponding to a musical instrument specified based on a default setting in response to a virtual musical instrument function or may be an object corresponding to a specified musical instrument by user selection. For example, the object may be an object corresponding to a string instrument.

In operation 603, the electronic device 100 may determine whether a gesture input (e.g., a touch or movement input) is detected. If the gesture input is not detected, the electronic device 100 may branch to operation 609 and may perform the operations from operation 609. If the gesture input is detected, in operation 605, in operation 605, the electronic device 100 may verify at least one of a location, a change amount, a size, a pressure, a speed, and a distance of the gesture input. In this operation, the electronic device 100 may select an input tool of the gesture input, corresponding to a state of the detected gesture input, through modeling information.

In operation 607, the electronic device 100 may adjust an output based on an input tool, a location, a speed, and a distance of the gesture input. For example, the electronic device 100 may adjust a sound value for each location of the specified object, a sound variation value based on a speed of the input tool of the gesture input, duration of a sound output based on a movement distance of the gesture input, and the like by the selected input tool of the gesture input. The electronic device 100 may model sounds to be output based on at least one of a location of the specified object, a speed, a movement distance, a pressure, and a direction of a movement pattern (or a motion pattern) of the gesture input (e.g., the touch or movement input). If detecting or obtaining a gesture input corresponding to a specified input tool, the electronic device 100 may vary the modeled sound to suit the input tool and may output the varied sound.

In operation 609, the electronic device 100 may determine whether a function end event is generated. If the function end event is not generated, the electronic device 100 may branch to operation 601 and may perform the operations again from operation 601. If the function end event is generated, the electronic device 100 may branch to a specified state.

Figure 6C:
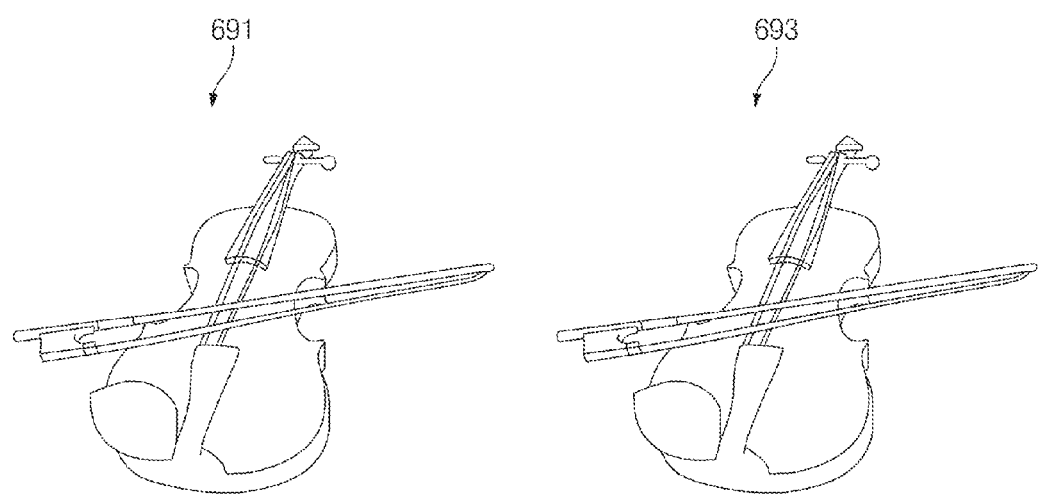
FIG. 6C is a drawing illustrating an accompanied performance motion with a virtual musical instrument according to an embodiment of the present disclosure.

FIG. 6C is a drawing illustrating an accompanied performance motion with a virtual musical instrument according to an embodiment of the present disclosure.

Referring to FIG. 6C, an electronic device 100 of FIG. 1 may output an object 691 and an object 693 in response to executing a virtual musical instrument function. According to an embodiment, the object 691 may be an object which outputs specified audio information in response to a gesture input (or a touch or movement input) received in the electronic device 100. The object 693 may be an object which outputs specified audio information in response to a gesture input (e.g., a touch or movement input) input from an external electronic device. A plurality of objects may be displayed in response to a state where the electronic device 100 operatively connects with the external electronic device. For example, if the electronic device 100 and the external electronic device connect with each other, the electronic device 100 (or the external electronic device) may display the objects 691 and 693 corresponding to two cellos. At least one of the objects 691 and 693 may be controlled by the external electronic device.

According to various embodiments, if the external electronic device is a cello played by an instructor, the electronic device 100 may play the cello in response to a gesture input value (e.g., a touch or movement input value) received from the instructor. In this operation, the electronic device 100 may output a display change of the object 693 in response to a gesture input (e.g., a touch or movement input) received from the external electronic device. For example, the object 693 may be changed based on a movement of a bow in response to the gesture input.

In FIG. 6C, an embodiment is exemplified as the two objects 691 and 693 are displayed. However, various embodiments of the present disclosure are not limited thereto. For example, the electronic device 100 (or the external electronic device) may output a plurality of the same types of virtual musical instruments or a plurality of different types of virtual musical instruments. Each of the objects may be configured to output specified audio information in response to a gesture input (e.g., a touch or movement input) received from the electronic device 100 and the external electronic device which connect over a network. Therefore, the electronic device 100 may provide an ensemble and accompanied performance effect by outputting audio information based on operating an object in response to a gesture input received from the external electronic device or another electronic device.

Figure 7A:
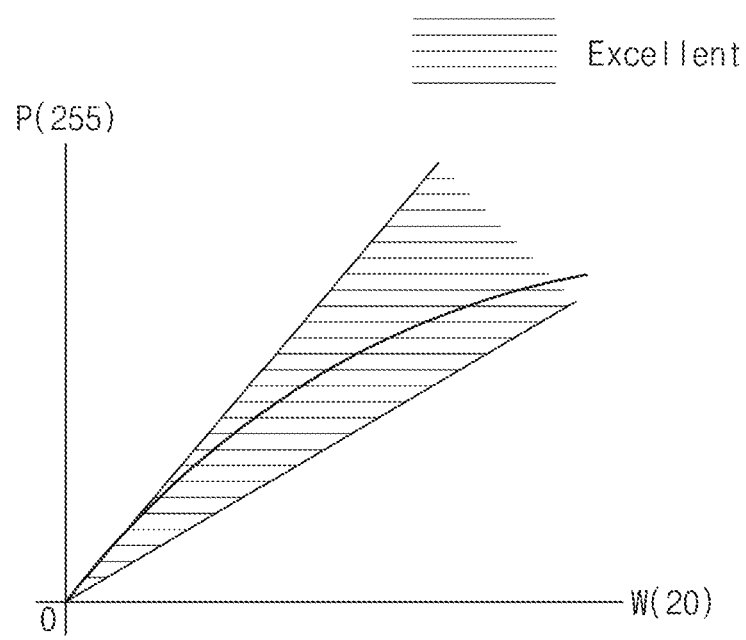
FIG. 7A is a graph illustrating output state optimization according to an embodiment of the present disclosure.

FIG. 7A is a graph illustrating output state optimization according to an embodiment of the present disclosure.

Referring to FIG. 7A, in connection with operating a string instrument, an electronic device 100 of FIG. 1 may provide an optimum sound output region in connection with capacitance, an area, and a speed. In FIG. 7A, P may represent power and may be a value corresponding to capacitance of a touch. W may be a value corresponding to a touch area. In FIG. 7A, a hatched portion may be an interval corresponding to an optimum sound output interval upon performance. In this regard, the electronic device 100 may map capacitance, a touch area, and a movement speed which occur upon a touch to a strength of a bow associated with a string instrument and the like, an area where the bow is in contact with strings, a speed of the bow, and the like to guide a digital musical instrument to change a sound. When a user of the electronic device 100 picks strings of a guitar and plays the guitar, the above-mentioned function may be applied in the same way. According to various embodiments, the electronic device 100 may apply modeling values to all musical instruments, such as a keyboard instrument, a string instrument, a percussion instrument, and a drum, using Equation 2 to digitize the modeling values and may use the digitalized values when the user plays the musical instruments.

$$P = -0.0039W^2 \pm 0.3754W - 0.1279\_{}^+S \qquad \text{Equation 2}$$

Herein, P may represent a force applied to a performance tool of a played musical instrument and may correspond to capacitance. W may represent an area where the performance tool is in contact with a specific object (or a musical instrument) and may correspond to a touch area. S may represent a movement speed of the performance tool and may correspond to a movement speed of a touch. A movement speed of strings may adjust a length of a sound. An area and a strength where a bow is in contact with strings may have an influence on a sound. For example, if the area and strength where the bow is in contact with the strings is larger, vibration of strings may be more reduced and a heavier sound (e.g., a sound close to a bass) may be output. If the area and strength where the bow is in contact with the strings is smaller, a sound with much vibration (e.g., strong vibrato) may be output. The electronic device 100 may optimize a sound generated based on an area, a strength, and a speed through modeling corresponding to the above-mentioned characteristics.

Figure 7B:
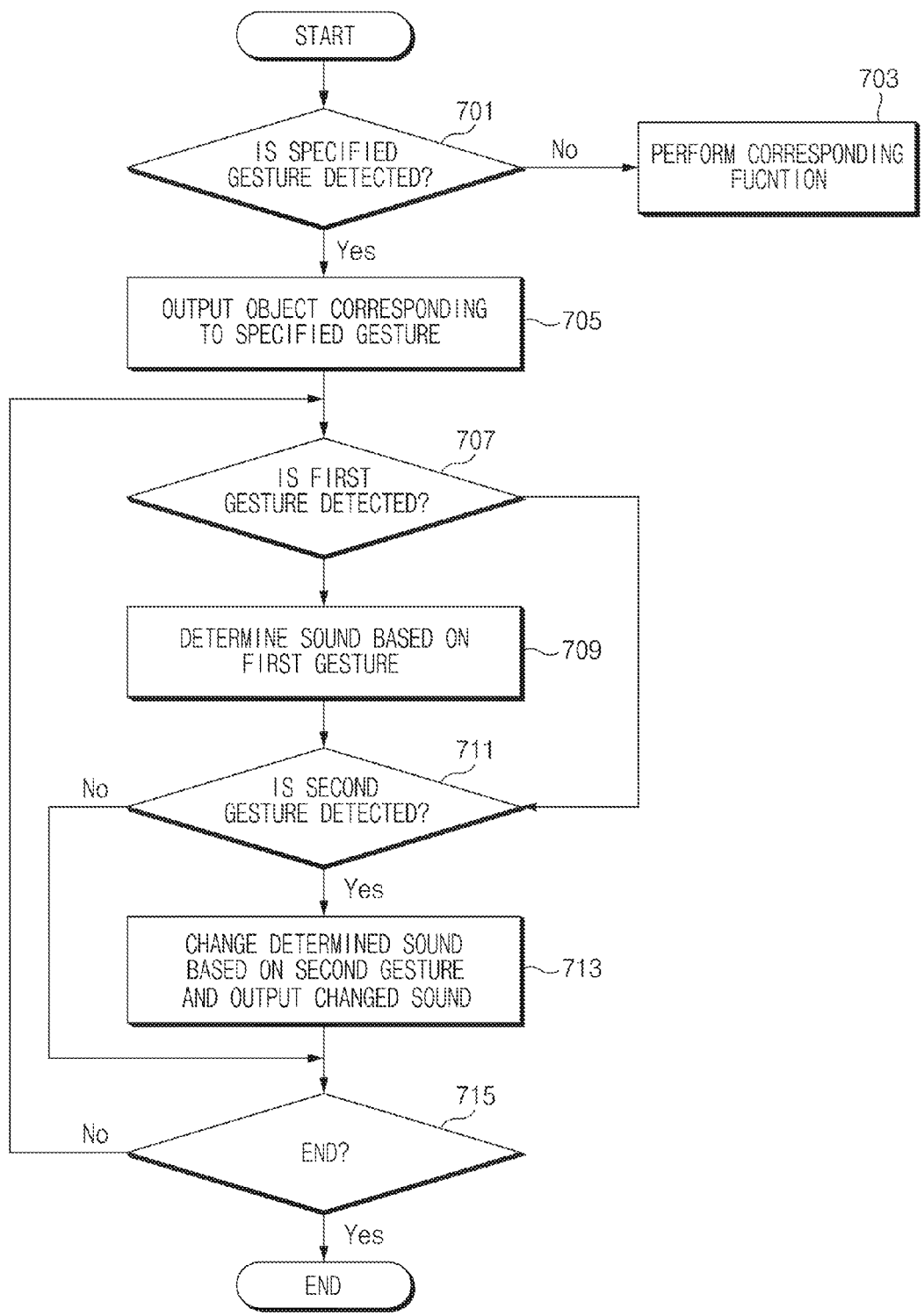
FIG. 7B is a flowchart illustrating a method for playing a virtual musical instrument including strings according to an embodiment of the present disclosure.

FIG. 7B is a flowchart illustrating a method for playing a virtual musical instrument including strings according to an embodiment of the present disclosure.

Referring to FIG. 7B, in operation 701 of in the method for playing the virtual musical instrument, an electronic device 100 may determine whether a specified gesture is detected. For example, if an event is generated, in operation 701, the electronic device 100 may determine whether the generated event is an event corresponding to a specified gesture input (e.g., a touch or movement input). If the generated event is not the event corresponding to the specified gesture input, in operation 703, the electronic device 100 may perform a function based on the generated event. If a specific event is not generated, the electronic device 100 may maintain a previous state or may be changed to a sleep state.

If the specified event is detected, in operation 705, the electronic device 100 may output an object corresponding to the specified gesture. For example, the electronic device 100 may output an object corresponding to at least one virtual musical instrument corresponding to the specified touch input on a display 160 of FIG. 1.

In operation 707, the electronic device 100 may determine whether a first gesture is detected. The first gesture may include a touch or movement event generated on a specified first location of an object (e.g., a location for determining a sound, for example, a certain location for determining a scale of a string instrument).

If the first gesture is detected, in operation 709, the electronic device 100 may determine a sound based on the first sound. In this operation, the electronic device 100 may determine the sound based on the first gesture with reference to an output table. The output table may store information for determining a sound based on a location or form of the first gesture in connection with a specified object. If the first gesture is not detected, the electronic device 100 may skip operation 709.

In operation 711, the electronic device 100 may determine whether a second gesture is detected. If the second gesture is detected, the electronic device 100 may change the sound based on the second gesture and may output the changed sound. The second gesture may correspond to, for example, a touch or movement which occurs on a specific second location (e.g., a location of a bow for playing strings, a location of the strings picked by fingers and the like). The output table may include modeling information associated with changing the sound based on the second gesture and outputting the changed sound. If the second gesture is not detected, the electronic device 100 may skip operation 713.

In operation 715, the electronic device 100 may determine whether an input event associated with ending a function of playing the virtual musical instrument is generated. When the input event is generated, the electronic device 100 may end the function of playing the virtual musical instrument. If the input event is not generated, the electronic device 100 may branch to operation 707 and may perform the operations again from operation 707. According to various embodiments, if an input corresponding to a specified gesture is received, the electronic device 100 may branch to operation 701 and may output an object corresponding to a virtual musical instrument corresponding to the specified gesture. In this operation, the electronic device 100 may output an object corresponding to a virtual musical instrument different from a previous object or may output objects corresponding to virtual musical instruments corresponding to objects which are greater in number than previous objects, based on modeled information such as a type or form of the specified gesture.

In FIG. 7B, an embodiment is exemplified as the second gesture is detected after the first gesture is detected. Various embodiments are not limited thereto. For example, the operation of detecting the first gesture and determining the sound based on the first gesture and the operation of detecting the second gesture and determining the sound based on the second gesture may be performed in parallel or independently of each other. A processor 120 of the electronic device 100 may apply the determining of the sound based on the first gesture to a first gesture input in real time if the first gesture input occurs on a specified first location. Also, if a second gesture input occurs on a specified second location, the electronic device 100 may change a sound, determined at a time when the second gesture input occurs, based on the second gesture input and may output the changed sound.

As described above, in case of a string instrument (e.g., a string instrument necessary for a bow), the processor 120 may map a motion of the bow to a motion of touch and moving a portion of determining a scale based on a location of each of multi-touch. For example, if the user touches strings using a first touch (or a first gesture), the processor 120 may determine a note of a sound and may map a second touching and moving motion (or a second gesture) to a motion of playing a bow. The processor 120 may process a note of each of a sound (e.g., a heavy and magnificent sound) when the user pushes hard on a touch and playing a bow upon the second touching and moving motion and a sound (e.g., a sound of a thin and high note) when he or she pushes lightly on a touch, for example, when he or she puts the bow lightly on strings to have a different sound.

According to various embodiments, in the case of a string instrument (e.g., gayageum, geomungo, and the like) not played with a bow, if the user touches strings using the first touch (or the first gesture) (e.g., if he or she determines a note), the processor 120 may perform a motion of picking strings of different locations from the first touch using a second touch (or the second gesture). In this case, the processor 120 may adjust a capacitance strength of the first touch using a motion of pushing hard on the first touch and then pushing lightly on the first touch to adjust vibration of a note of a real gayageum or geomungo.

Figure 8A:
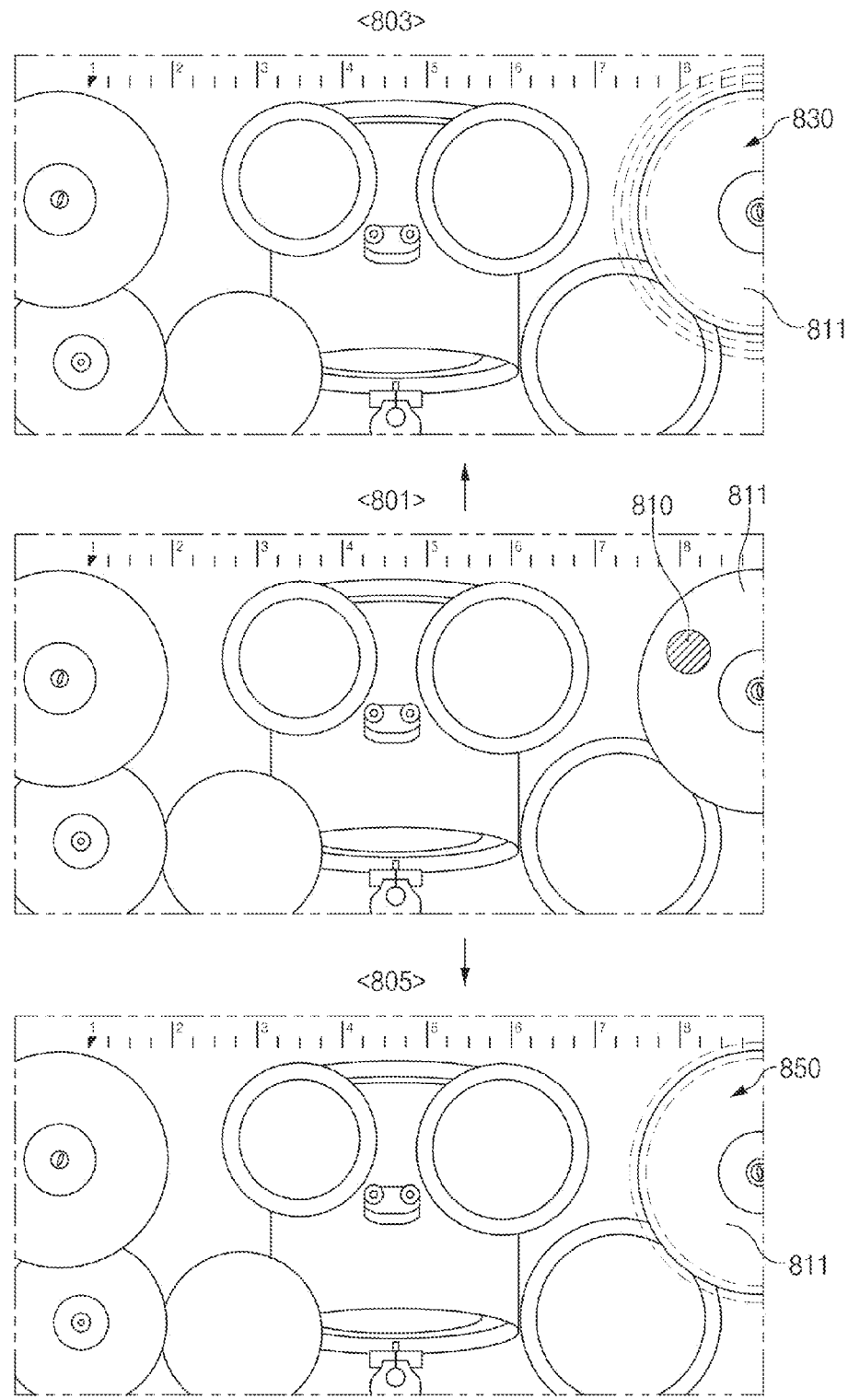
FIG. 8A is a drawing illustrating a screen change based on a gesture input or output strength according to an embodiment of the present disclosure.

FIG. 8A is a drawing illustrating a screen change based on a gesture input or output strength according to an embodiment of the present disclosure.

Referring to FIG. 8A, an electronic device 100 of FIG. 1 may output a specified object in response to executing a virtual musical instrument function. For example, in state 801, the electronic device 100 may provide a screen interface of arranging objects corresponding to a drum or cymbals and the like in a certain interval. If receiving a gesture input, the electronic device 100 may determine characteristics of audio information to be output, based on an input tool selected based on an electric change based on the gesture input, an object selected by the gesture input, and at least one of a location, a speed, an area, and a strength of the gesture input on the selected object. For example, the electronic device 100 may determine a tone of audio information to be output, based on a type of the input tool and a location of the gesture input on the selected object. Also, the electronic device 100 may determine at least one of a sound pressure, an output level, and an output duration of audio information to be output, based on at least one of an area, a strength, and a speed of the gesture input. The electronic device 100 may output the determined audio information through an input and output interface 150 of FIG. 1.

According to an embodiment, the electronic device 100 may vary a display variation degree of a selected object based on a strength of a gesture input (e.g., a touch or movement input). For example, the electronic device 100 may detect an event for providing a gesture input on a certain point 810 of an object 811 using a first strength. In this case, in state 803, the electronic device 100 may apply a display effect 830 for showing a variation degree of the object 811 to be relatively larger. The display effect 830 may correspond to, for example, an effect of displaying a size of the shake of outer lines to be relatively larger. In this regard, the electronic device 100 may implement a shake of the object 811 corresponding to first strength by having a specified first number of objects (or frames) (e.g., 5 to 8 objects or frames) corresponding to a shake of the object 811 and alternately outputting the first number of objects.

According to various embodiments, the electronic device 100 may detect an event of a gesture input (e.g., a touch or movement input) of a second strength on the certain point 810 of the object 811. In this case, in state 805, the electronic device 100 may apply a display effect 850 for showing a change degree of the object 811 to be relatively smaller than state 803. The display effect 850 may correspond to, for example, an effect of displaying a size of the shake of outer lines of the object 811 to be relatively smaller. In this case, the electronic device 100 may implement a shake of the object 811 corresponding to the second strength by having a specified second number of objects (e.g., less than the first number of objects) corresponding to the shake of the object 811 and alternately outputting the second number of objects.

As described above, the electronic device 100 may represent a touch strength as being visually different by varying a display form of the object in response to a strength of a gesture input. According to various embodiments, the electronic device 100 may vary a displayed form based on a location of a gesture input (e.g., a touch or movement input) associated with a type of an input tool and a selected object. For example, if a location of an input tool or a gesture input (e.g., a touch or movement input) differs, the electronic device 100 may vary a range where the object is changed and displayed. According to an embodiment, the electronic device 100 may change and display an object within a first range relative to a touch point upon a finger touch and may change and display the object within a second range (e.g., a range different from the first range) relative to a touch point upon a touch pen touch.

According to various embodiments, the electronic device 100 may represent an object in a different way in response to a speed of a gesture input (e.g., a touch or movement input). For example, if receiving a relatively fast gesture input (e.g., a relatively fast touch or movement input), the electronic device 100 may apply a display effect which is varied relatively fast for a relatively long duration. If receiving a relatively slow gesture input (e.g., a relatively slow touch or movement input), the electronic device 100 may apply a display effect which is varied relatively slower (e.g., slower than a variation speed in a fast touch state) for a relatively short duration (e.g., shorter than duration in the fast touch state). As described above, the electronic device 100 may represent a velocity variation based on at least one of a strength of a gesture input (e.g., a touch or movement input), a type of an input tool, and a touch form.

Figure 8B:
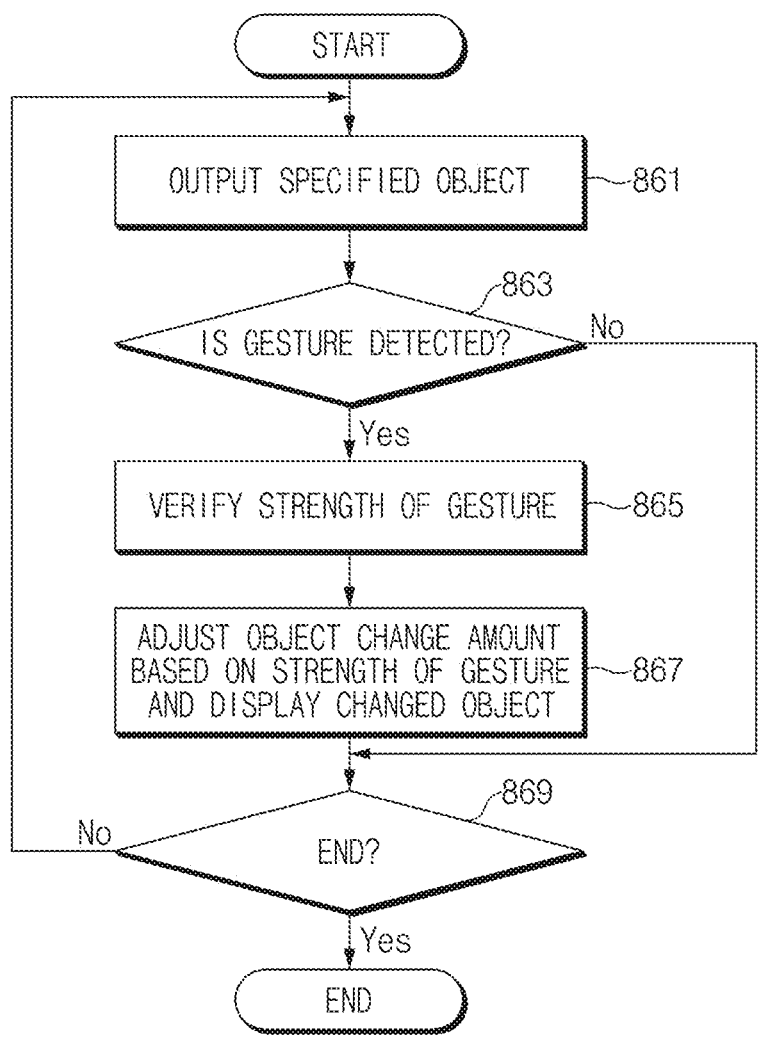
FIG. 8B is a flowchart illustrating a screen change method based on a strength of a gesture input according to an embodiment of the present disclosure.

FIG. 8B is a flowchart illustrating a screen change method based on a strength of a gesture input according to an embodiment of the present disclosure.

Referring to FIG. 8B, in operation 861 of the screen change method based on the strength of the gesture input, an electronic device 100 of FIG. 1 may output a specified object. For example, the electronic device 100 may output at least one object corresponding to a performance musical instrument based on executing a virtual musical instrument.

In operation 863, the electronic device 100 may determine whether a gesture input (e.g., a touch or movement input) is received. If the gesture input (e.g., the touch or movement input) is not received, the electronic device 100 may branch to operation 869 and may perform the operations from operation 869. If receiving the gesture input (e.g., the touch or movement input), in operation 865, the electronic device 100 may verify a strength of the gesture input. For example, the electronic device 100 may select a gesture input tool based on modeling information an electric change by a gesture is modeled and may verify a strength of the gesture input in response to a gesture state (e.g., a touch area, a touch change speed, a movement speed, a movement direction, a movement distance, and the like) of the gesture input tool.

In operation 867, the electronic device 100 may adjust an object change amount based on the strength of the gesture input and may display the adjusted object. For example, if the strength of the gesture input is greater than or equal to a specified first strength, the electronic device 100 may display a size of the object change amount as a first size. Also, if the strength of the gesture input is less than the specified first strength, the electronic device 100 may display a size of the object change amount as a second size which is smaller than the first size.

According to various embodiments, the electronic device 100 may adjust an object change amount based on an input tool and a strength of the gesture input and may display the adjusted object. For example, although there is the same strength of the gesture input (e.g., the touch or movement input), the electronic device 100 may represent an object change amount in a different way based on a type of the input tool of the gesture input. According to an embodiment, if the specified object is a drum, although a strength of a gesture input (e.g., a touch or movement input) by a gesture input to (e.g., a stick) corresponding to a touch pen or a gesture means (e.g., a hand or other objects, and the like) is similar to a strength of a gesture input (e.g., a touch or movement input) by a gesture input tool (e.g., a palm) corresponding to fingers, the electronic device 100 may represent an object change amount in a different way. For example, the electronic device 100 may represent an object change amount by a palm input tool to be larger than an object change amount by a stick input tool.

In operation 869, the electronic device 100 may determine whether a function end event is generated. If the function end event is not generated, the electronic device 100 may branch to operation 861 and may perform the operations again from operation 861. If the function end event is generated, the electronic device 100 may branch to a specified state.

According to various embodiments, a touch processing method may include outputting at least one specified object corresponding to a virtual musical instrument, receiving a gesture input on the object, selecting an input tool based on an electric change by the gesture input, a result value and a predicted value which are calculated in software, or modeling information corresponding to a programmed algorithm, and adjusting characteristics of an output audio in response to a type of the input tool and a state of the gesture input and outputting the adjusted audio.

According to various embodiments, the selecting of the input tool may include selecting the type of the input tool based on at least one of a touch area by the gesture input, a change of the touch area, and an electric change by a touch for a specified time before and after a time when a touch contact occurs.

According to various embodiments, the method may further include detecting a touch strength based on at least one of a touch area by the gesture input, a change of the touch area, and an electric change by a touch.

According to various embodiments, the outputting of the adjusted audio may include outputting a level of the audio or an audio output duration in a different way based on a level of strength of the gesture input.

According to various embodiments, the method may further include outputting a display change amount of the object based on at least one of a touch strength by the gesture input, a touch location by the gesture input, and a type of the input tool.

According to various embodiments, the outputting of the display change amount may include at least one of displaying the display change amount of the object to be relatively larger if the strength of the gesture input is greater than or equal to a specified level and displaying the display change amount of the object to be relatively smaller if the strength of the gesture input is less than the specified level.

According to various embodiments, the outputting of the adjusted audio may include outputting a tone or a frequency of the audio in a different way in response to a location of the gesture input on the object.

According to various embodiments, the outputting of the adjusted audio may include outputting an output level of the audio in a different way in response to a location of the gesture input on the object.

According to various embodiments, the outputting of the adjusted audio may include at least one of outputting the audio by mapping a level of capacitance to a force applied to strings of a string instrument, outputting the audio by mapping a touch area to an area which is in contact with strings of a virtual musical instrument, and outputting the audio by mapping a speed of the gesture input to a speed of playing strings of a virtual musical instrument or a speed of playing the virtual musical instrument.

According to various embodiments, the outputting of the adjusted audio may include at least one of outputting the audio by mapping a level of capacitance to a force applied to one side of a virtual rotatable musical instrument and outputting the audio by mapping a speed of the gesture input to a speed of playing the virtual rotatable musical instrument.

According to various embodiments, a method for playing a virtual musical instrument in an electronic device including a memory for storing at least one sound data corresponding to at least one musical instrument may include obtaining a gesture of a user of the electronic device through at least one sensor operatively connected with the electronic device, outputting the at least one sound data corresponding to at least one musical instrument through an output device operatively connected with the electronic device, if the gesture is a gesture corresponding to the at least one musical instrument and not outputting the sound data, if the gesture is a gesture which does not correspond to the at least one musical instrument.

According to various embodiments, the outputting of the sound data comprises outputting the sound data while changing at least part of properties of the sound data based on at least properties of the gesture.

According to various embodiments, the outputting of the sound data comprises displaying an item corresponding to the at least one musical instrument through a display operatively connected with the electronic device, and wherein the displaying of the item comprises displaying a region corresponding to at least one sound of the item based on at least properties of the gesture, the region being actually pushed.

According to various embodiments, the not outputting of the sound data comprises: performing another function or an application in response to the gesture.

According to various embodiments, the at least one musical instrument comprises a first musical instrument and a second musical instrument, wherein the at least one sound comprises a first sound and a second sound, and the outputting of the sound data comprises: outputting the first sound, if the gesture is a gesture corresponding to the first musical instrument, and outputting the second sound, if the gesture is a gesture corresponding to the second musical instrument.

According to various embodiments, the at least one musical instrument comprises the first musical instrument and the second musical instrument, the at least one sound comprises the first sound and the second sound, and the gesture corresponds to the first musical instrument, the method further comprises obtaining another gesture and outputting the second sound, if the other gesture is a gesture corresponding to the second musical instrument.

According to various embodiments, the first sound (or the second sound) is output concurrently with at least part of the second sound (or the first sound).

According to various embodiments, the method further comprises outputting a musical instrument corresponding to an external device connected with the electronic device.

According to various embodiments, the method further comprises receiving another user gesture from the external device and outputting a musical instrument performance sound in response to the received other user gesture.

According to various embodiments, a computer-readable recording medium storing embodied thereon instructions for, when executed by at least one processor, causing the processor to perform at least one operation, the at least one operation configured to: obtain a gesture of a user of the electronic device through at least one sensor operatively connected with an electronic device including a memory for storing at least one sound data corresponding to at least one musical instrument, output the at least one sound data corresponding to the at least one musical instrument through an output device operatively connected with the electronic device, if the gesture is a gesture corresponding to the at least one musical instrument and not output the sound data, if the gesture is a gesture which does not correspond to the at least one musical instrument.

Figure 9:
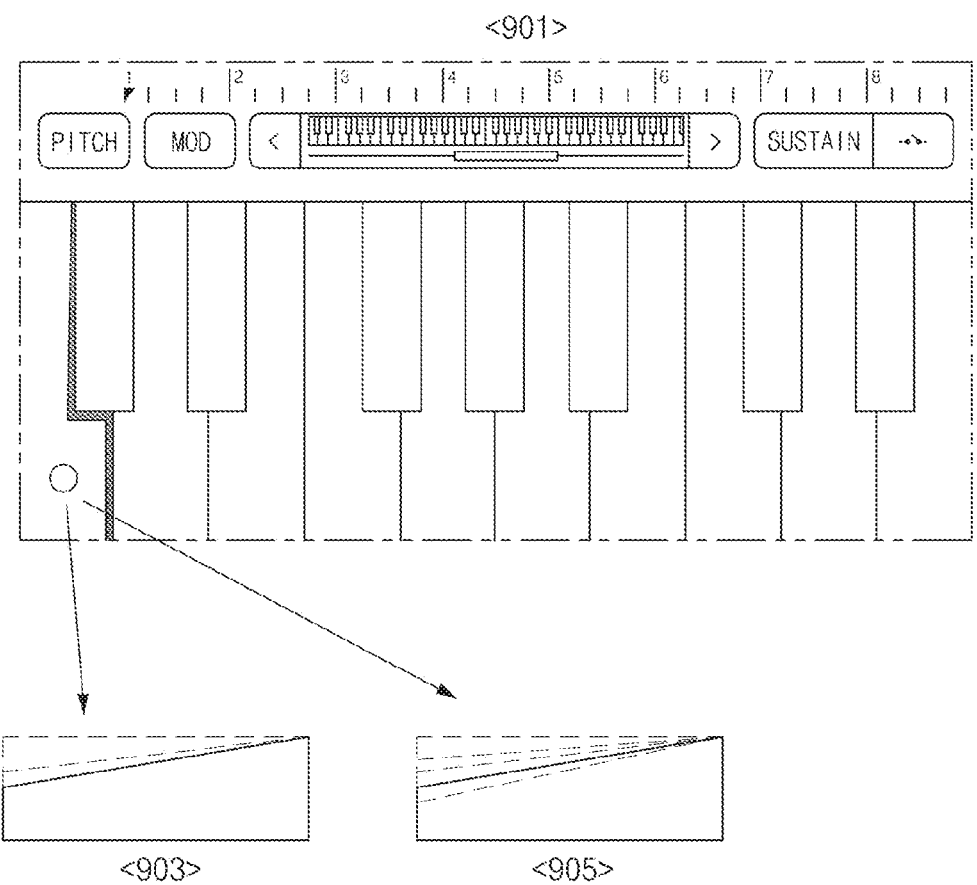
FIG. 9 is a drawing illustrating a screen change based on a gesture input or output strength according to another embodiment of the present disclosure.

FIG. 9 is a drawing illustrating a screen change based on a gesture input or output strength according to another embodiment of the present disclosure.

Referring to FIG. 9, in state 901, an electronic device 100 of FIG. 1 may output a specified object, for example, a keyboard object on a display 160 of FIG. 1 in response to executing a virtual musical instrument function. For example, a plurality of keyboards may be arranged on the keyboard object. If a specific keyboard is selected, the electronic device 100 may output audio information of a scale corresponding to the corresponding keyboard. In this operation, the electronic device 100 may detect a gesture strength of a gesture input tool and may adjust a level of audio information in response to the gesture strength.

According to various embodiments, the electronic device 100 may vary a display change amount of the keyboard in response to the gesture strength. For example, if a gesture event (e.g., a touch or movement event) of less than a first strength is generated on a specific keyboard, the electronic device 100 may display a push state of a selected keyboard. In state 903, the electronic device 100 may display a keyboard change using a change amount of a first size.

According to various embodiments, if the gesture event of the first strength or more is generated on the specific keyboard, the electronic device 100 may display a push state of the selected keyboard. In state 905, the electronic device 100 may display a keyboard change using a change amount of a second size (e.g., a size which is larger than the first size).

Figure 10:
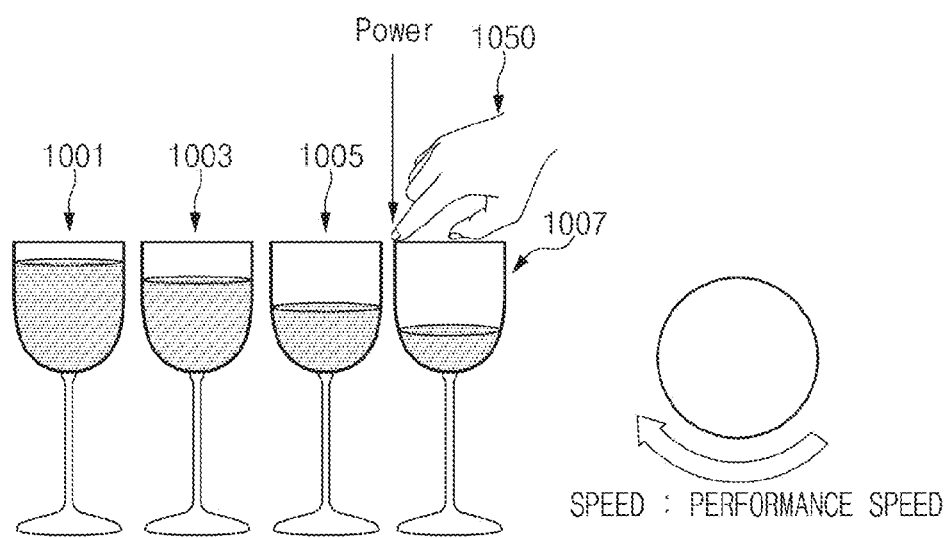
FIG. 10 is a screen interface illustrating an output change based on a gesture location and speed according to an embodiment of the present disclosure.

FIG. 10 is a screen interface illustrating an output change based on a gesture location and speed according to an embodiment of the present disclosure.

Referring to FIG. 10, an electronic device 100 of FIG. 1 may output specified objects in response to executing a virtual musical instrument function. The specified objects may include a cup object 1001 of a form of filling with water of a first height, a cup object 1003 of a form of filling with water of a second height, a cup object 1005 of a form of filling with water of a third height, and a cup object 1007 of a form of filling with water of a fourth height. The cup objects 1001 to 1007 may be configured to output audio information of different frequency bands in response to a gesture (e.g., a touch or movement). According to an embodiment, if a gesture associated with a gesture input object 1050 is generated on a certain location of each of the cup objects 1001 to 1007 (e.g., the periphery of an opening of each of the cup objects 1001 to 1007), the electronic device 100 may output audio information of a corresponding frequency band.

According to various embodiments, the electronic device 100 may combine a gesture strength, an amount of water set in a cup object, and a gesture speed and may output audio information corresponding to the combined information. The gesture strength may be a strength of pushing on a cup and may correspond to capacitance based on a gesture (e.g., a touch or movement). The electronic device 100 may provide a musical instrument performance effect more similar to a real situation using a user input such as a gesture input strength, a touch direction, and a touch form.

As described above, according to an embodiment, a method for playing a virtual musical instrument may include obtaining information of a virtual musical instrument, receiving at least one gesture input, determining a gesture input tool by obtaining a value for the at least one received gesture input information, and outputting an audio and a UI effect based on the obtained value for the gesture input information corresponding to the gesture input tool for each gesture input.

According to various embodiments, the gesture input tool may include a finger or an accessory with conductivity. An audio function may change a volume, a sound pressure, a speed, and the like in response to a touch. The audio function may output different audio information based on a touch input location, a touch strength, a touch area, a touch speed, and a touch rotation. The UI effect may include a shake, vibration, a push, and the like of a virtual musical instrument. The virtual musical instrument may include a percussion instrument, a string instrument, a keyboard instrument, a rotator input musical instrument, and the like. The virtual musical instrument may be represented to be used interchangeably and may indicate a different output for each musical instrument.

According to various embodiments, the electronic device may provide an adaptive output change suitable for a gesture input (e.g., a touch input, a movement input (or a motion input), and the like) of the user in a musical instrument function provided in the form of software.

Figure 11:
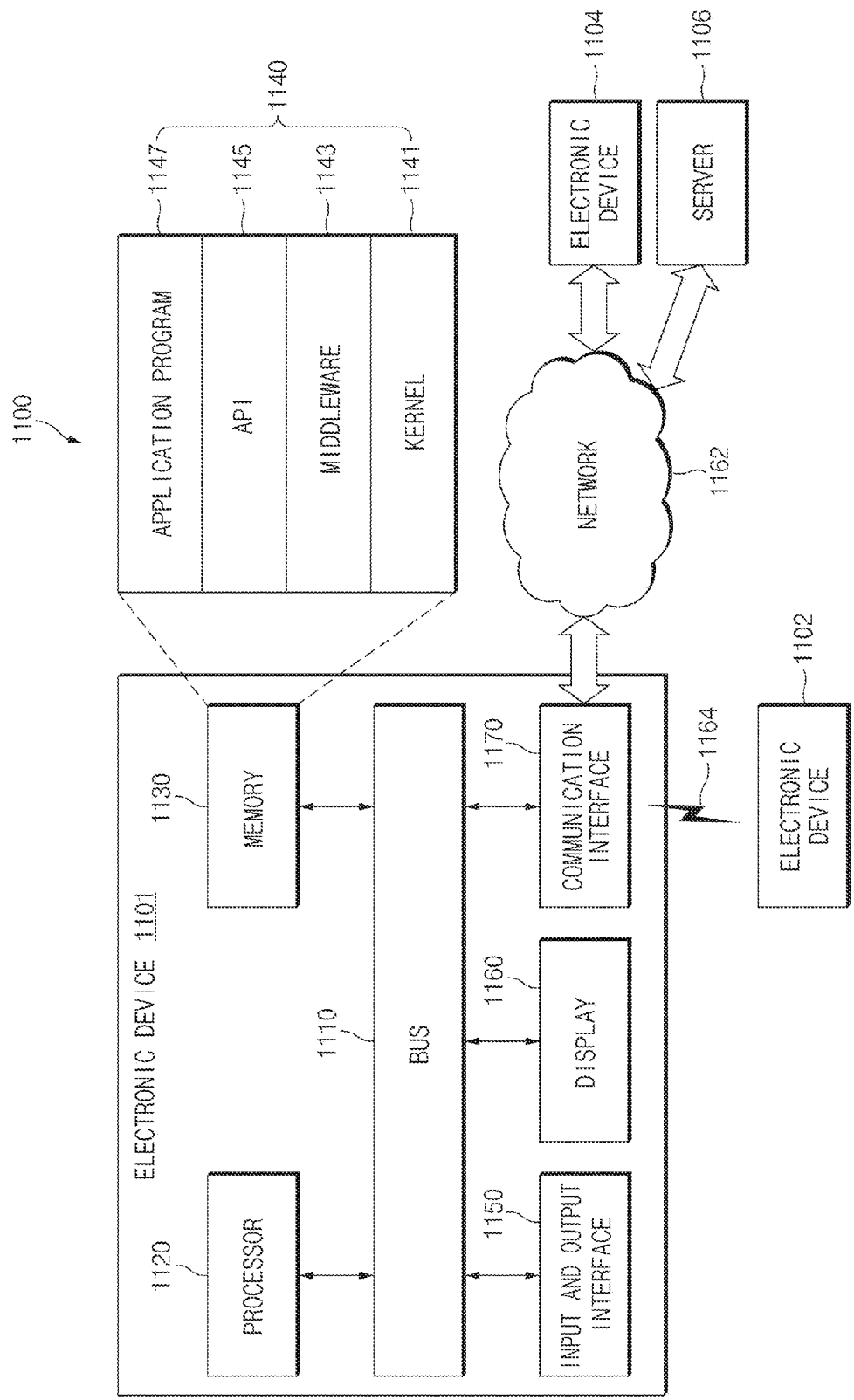
FIG. 11 is a diagram illustrating an example of an operation environment of an electronic device according to an embodiment of the present disclosure.

FIG. 11 is a diagram illustrating an electronic device operating environment according to an embodiment of the present disclosure of the present disclosure.

Referring to FIG. 11, in an electronic device operating environment 1100, an electronic device 1101, 1102 or 1104 of various embodiments of the present disclosure or a server 1106 may be connected to each other via a network 1162 or short-range communications. The electronic device 1101 may include a bus 1110, a processor 1120, a memory 1130, an input/output interface 1150, a display 1160, and a communication interface 1170. In some various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a CPU, an AP, and a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. Memory 1130 may store software and/or a program 1140. The program 1140 may include, for example, a kernel 1141, a middleware 1143, an application programming interface (API) 1145, and/or an application program (or an application) 1147. At least a portion of the kernel 1141, the middleware 1143, or the API 1145 may be referred to as an OS.

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to another element(s) of the electronic device 1101. Furthermore, the input/output interface 1150 may output instructions or data received from another element(s) of the electronic device 1101 to the user or another external device.

The display 1160 may include, for example, a LCD, a LED display, an OLED display, a microelectromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1102 or the server 1106). For example, the communication interface 1170 may be connected to the network 1162 via wireless or wired communications so as to communicate with the external device (e.g., the server 1106). For example, the communication interface 1170 may be connected to a first electronic device 1102 directly via a wired or wireless connection 1164.

The wireless communications may employ at least one of cellular communication protocols such as long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). Furthermore, the wireless communications may include, for example, short-range communications. The short-range communications may include at least one of Wi-Fi, Bluetooth, near field communication (NFC), magnetic stripe transmission (MST), and GNSS.

The MST may generate pulses according to transmission data using electromagnetic signals, and the pulses may generate magnetic signals. The electronic device 1101 may transmit the magnetic signals to a POS, and the POS may detect the magnetic signals using an MST reader, and may convert detected magnetic signals into electric signals to thereby restore the data.

The GNSS may include, for example, at least one of global positioning system (GPS), global navigation satellite system (GLONASS), BeiDou navigation satellite system (hereinafter referred to as "BeiDou"), and Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), and the like. The network 1162 may include at least one of telecommunications networks, for example, a computer network (e.g., a local area network (LAN) or wide area network (WAN)), the Internet, and a telephone network.

The type of the first external electronic device 1102 or the second external electronic device 1104 may be the same as or different from that of the electronic device 1101. In some cases, server 1106 may include a group of one or more servers. In various embodiments, a portion or all of operations performed in the electronic device 1101 may be performed in one or more other electronic devices (e.g., the electronic device 1102, 1104 or the server 1106). In a case where the electronic device 1101 is required to perform a certain function or service automatically or in response to a request, the electronic device 1101 may request at least a portion of functions related to the function or service from another device (e.g., the electronic device 1102, 1104 or the server 1106) instead of or in addition to performing the function or service for itself. The other electronic device (e.g., the electronic device 1102, 1104 or the server 1106) may perform the requested function or additional function, and may transfer a result of the performance to the electronic device 1101. The electronic device 1101 may intactly use or additionally process a received result to provide the requested function or service. To this end, for example, a cloud computing technology, a distributed computing technology, or a client-server computing technology may be used.

Figure 12:
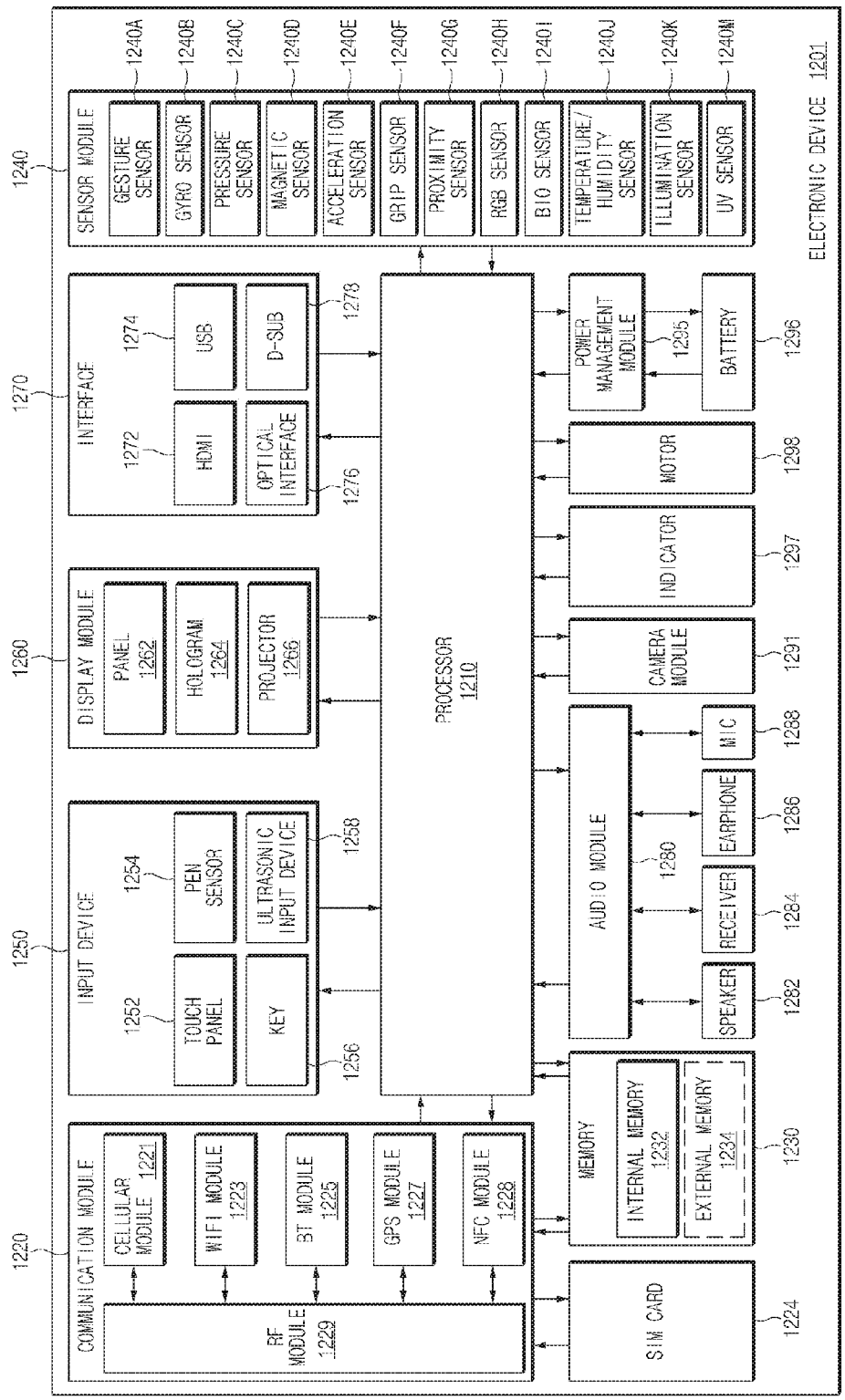
FIG. 12 is a block diagram illustrating an electronic device according to an embodiment of the present disclosure.

FIG. 12 is a block diagram illustrating an electronic device according to an embodiment of the present disclosure.

Referring to FIG. 12, an electronic device 1201 may include, for example, a part or the entirety of the electronic device 1101 illustrated in FIG. 11. The electronic device 1201 may include at least one processor (e.g., AP) 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an OS or an application program so as to control a plurality of hardware or software elements connected to the processor 1210, and may process various data and perform operations. The processor 1210 may be implemented with, for example, a SoC. According to an embodiment of the present disclosure, the processor 1210 may further include a graphics processing unit (GPU) and/or an image signal processor (ISP). The processor 1210 may include at least a portion (e.g., a cellular module 1221) of the elements illustrated in FIG. 12. The processor 1210 may load, on a volatile memory, an instruction or data received from at least one of other elements (e.g., a nonvolatile memory) to process the instruction or data, and may store various data in a nonvolatile memory.

The communication module 1220 may have a configuration that is the same as or similar to that of the communication interface 1170 of FIG. 11. The communication module 1220 may include, for example, a cellular module 1221 (e.g., the modem), a Wi-Fi module 1223, a Bluetooth module 1225, a GNSS module 1227 (e.g., a GPS module, a GLONASS module, a BeiDou module, or a Galileo module), an NFC module 1228, and a radio frequency (RF) module 1229.

The cellular module 1221 may provide, for example, a voice call service, a video call service, a text message service, or an Internet service through a communication network. The cellular module 1221 may identify and authenticate the electronic device 1201 in the communication network using the SIM 1224 (e.g., a SIM card). The cellular module 1221 may perform at least a part of functions that may be provided by the processor 1210. The cellular module 1221 may include a CP.

Each of the Wi-Fi module 1223, the Bluetooth module 1225, the GNSS module 1227 and the NFC module 1228 may include, for example, a processor for processing data transmitted/received through the modules. According to some various embodiments of the present disclosure, at least a part (e.g., two or more) of the cellular module 1221, the Wi-Fi module 1223, the Bluetooth module 1225, the GNSS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1223, the Bluetooth module 1225, the GNSS module 1227, and the NFC module 1228 may transmit/receive RF signals through a separate RF module.

The SIM 1224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 (e.g., the memory 1130) may include, for example, an internal memory 1232 or an external memory 1234. The internal memory 1232 may include at least one of a volatile memory (e.g., a dynamic random access memory (DRAM), a static RAM (SRAM), a synchronous dynamic RAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, and a solid state drive (SSD).

The external memory 1234 may include a flash drive such as a compact flash (CF), a secure digital (SD), a micro-SD, a mini-SD, an extreme digital (xD), a multimediacard (MMC), a memory stick, or the like. The external memory 1234 may be operatively and/or physically connected to the electronic device 1201 through various interfaces.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, and an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a (digital) pen sensor 1254, a key 1256, or an ultrasonic input device 12512. The touch panel 1252 may employ at least one of capacitive, resistive, IR, and UV sensing methods. The touch panel 1252 may further include a control circuit. The touch panel 1252 may further include a tactile layer so as to provide a haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone (mic) 1288 so as to identify data corresponding to the ultrasonic waves sensed.

The display 1260 (e.g., the display 1160) may include a panel 1262, a hologram device 1264, or a projector 1266. The panel 1262 may have a configuration that is the same as or similar to that of the display 260 of FIGS. 2A and 2B. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-subminiature (D-sub) 1278. The interface 1270, for example, may be included in the communication interface 1170 illustrated in FIG. 11. Additionally or alternatively, the interface 1270 may include, for example, a mobile high-definition link (MHL) interface, an SD card/MMC interface, or an infrared data association (IrDA) interface.

The audio module 1280 may convert, for example, a sound into an electrical signal or vice versa. At least a portion of elements of the audio module 1280 may be included in the input/output interface 750 illustrated in FIG. 11. The audio module 1280 may process sound information input or output through a speaker 1282, a receiver 1284, an earphone 1286, or the microphone (mic) 1288.

The camera module 1291 is, for example, a device for shooting a still image or a video. According to an embodiment of the present disclosure, the camera module 1291 may include at least one image sensor (e.g., a front sensor or a rear sensor), a lens, an ISP, or a flash (e.g., an LED or a xenon lamp).

The power management module 1295 may manage power of the electronic device 1201. According to an embodiment of the present disclosure, the power management module 1295 may include a power management IC (PMIC), a charger IC, or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), mediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 13:
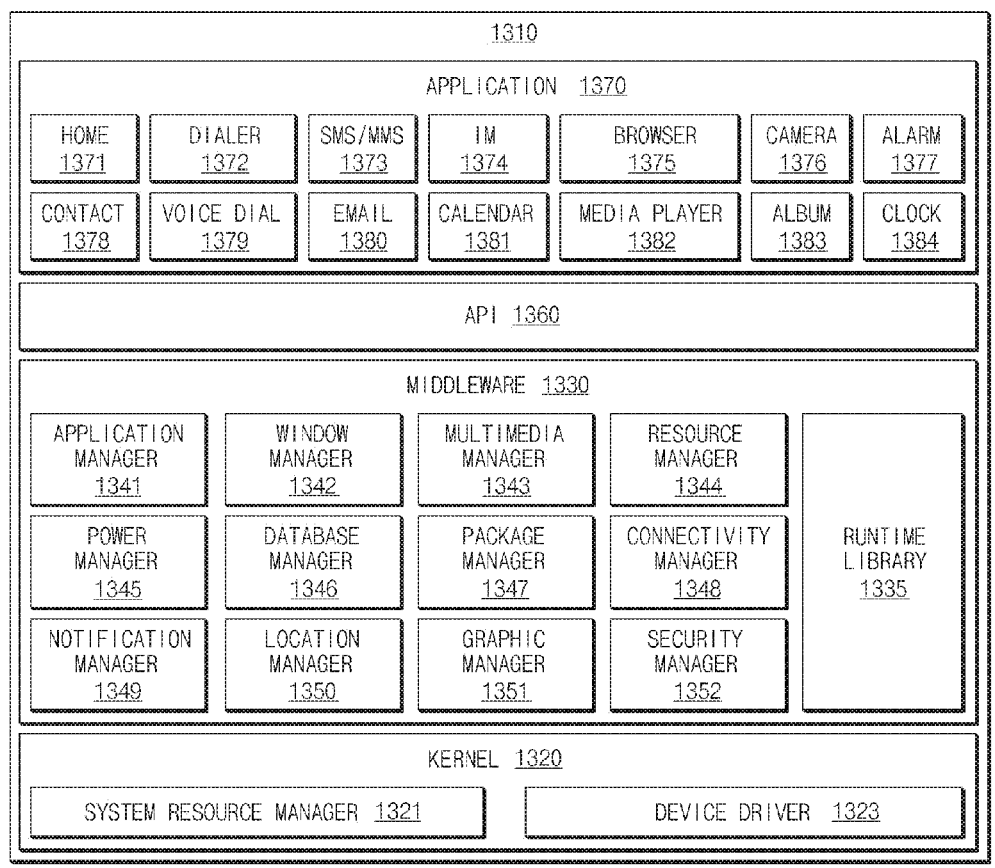
FIG. 13 is a block diagram illustrating a program module according to an embodiment of the present disclosure.

FIG. 13 is a block diagram illustrating a program module according to an embodiment of the present disclosure.

Referring to FIG. 13, a program module 1310 (e.g., the program 1140) may include an OS for controlling a resource related to an electronic device (e.g., the electronic device 1101) and/or various applications (e.g., the application program 1147) running on the OS. The OS may be, for example, Android, iOS, Windows, Symbian, Tizen, or the like.

The program module 1310 may include a kernel 1320, a middleware 1330, an API 1360, and/or an application 1370. At least a part of the program module 1310 may be preloaded on an electronic device or may be downloaded from an external electronic device (e.g., the electronic device 1102 or 1104 or the server 1106).

The kernel 1320 (e.g., the kernel 1141) may include, for example, a system resource manager 1321 or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include, for example, a library module that a complier uses to add a new function through a programming language while the application 1370 is running. The runtime library 1335 may perform a function for input/output management, memory management, or an arithmetic function.

The application manager 1341 may mange, for example, a life cycle of at least one of the applications 1370. The window manager 1342 may manage a GUI resource used in a screen. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage a battery or power and may provide power information required for operating the electronic device. The database manager 1346 may generate, search, or modify a database to be used in at least one of the applications 1370. The package manager 1347 may manage installation or update of an application distributed in a package file format.

The connectivity manger 1348 may manage wireless connection of Wi-Fi, Bluetooth, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a UI related thereto. The security manager 1352 may provide various security functions required for system security or user authentication. According to an embodiment of the present disclosure, in the case in which an electronic device (e.g., the electronic device 1101) includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an OS to provide differentiated functions. Furthermore, the middleware 1330 may delete a part of existing elements or may add new elements dynamically.

The API 1360 (e.g., the API 1145) which is, for example, a set of API programming functions may be provided in different configurations according to an OS. For example, in the case of Android or iOS, one API set may be provided for each platform, and, in the case of Tizen, at least two API sets may be provided for each platform.

The application 1370 (e.g., the application program 1147), for example, may include at least one application capable of performing functions such as a home 1371, a dialer 1372, a short message service (SMS)/multimedia message service (MMS) 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, health care (e.g., measure an exercise amount or blood sugar), or environmental information provision (e.g., provide air pressure, humidity, or temperature information).

According to an embodiment of the present disclosure, the application 1370 may include an information exchange application for supporting information exchange between the electronic device (e.g., the electronic device 1101) and an external electronic device (e.g., the electronic device 1102 or 1104). The information exchange application may include, for example, a notification relay application for relaying specific information to the external electronic device or a device management application for managing the external electronic device.

For example, the notification relay application may have a function for relaying, to an external electronic device (e.g., the electronic device 1102 or 1104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the electronic device 1102 or 1104) communicating with the electronic device, an application running in the external electronic device, or a service (e.g., a call service, a message service, or the like) provided from the external electronic device.

According to an embodiment of the present disclosure, the application 1370 may include a specified application (e.g., a healthcare application of a mobile medical device) according to an attribute of the external electronic device (e.g., the electronic device 1102 or 1104). The application 1370 may include an application received from an external electronic device (e.g., the server 1106 or the electronic device 1102 or 1104). The application 1370 may include a preloaded application or a third-party application downloadable from a server. The names of the elements of the program module 1310 illustrated may vary with the type of an OS.

According to various embodiments of the present disclosure, at least a part of the program module 1310 may be implemented with software, firmware, hardware, or a combination thereof. At least a part of the program module 1310, for example, may be implemented (e.g., executed) by a processor (e.g., the processor 1210). At least a part of the program module 1310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., compact disc (CD)-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touch screen display;
at least one of a speaker or a sound interface;
at least one processor configured to electrically connect to the touch screen display, the speaker, and the sound interface; and
a memory configured to electrically connect to the at least one processor,
wherein the memory stores instructions for, when executed, causing the at least one processor to:
display at least one item comprising a musical instrument shape on the touch screen display,
receive a touch input through the touch screen display,
load sound data corresponding to the at least one item based on the touch input,
process the sound data based at least in part on information associated with the touch input, and
output the processed sound data through the speaker or the sound interface, and
wherein the memory is further configured to store instructions for, when executed, further causing the at least one processor to display a region corresponding to at least one sound of the item based at least in part on properties of a gesture, when the region receives an input.

2. The electronic device of claim 1, wherein the information associated with the touch input comprises at least one of a location, a strength, a time, a direction, an area, a speed, or a pressure of the touch input.

3. The electronic device of claim 1, wherein the instructions are configured to further cause the at least one processor to:
change the at least one displayed item based at least in part on the information associated with the touch input; and display the at least one changed item on the touch screen display.

4. An electronic device comprising:
a display;
at least one of a speaker or a sound interface;
at least one processor configured to electrically connect to the display, the speaker, and the sound interface; and
a memory configured to electrically connect to the at least one processor,
wherein the memory stores instructions for, when executed, causing the at least one processor to:
obtain a gesture of a user of the electronic device through at least one sensor operatively connected with the electronic device,
output sound data corresponding to at least one musical instrument through an output device operatively connected with the electronic device, if the gesture is a gesture corresponding to at least one musical instrument, and
not output the sound data, if the gesture is not the gesture corresponding to the at least one musical instrument, and
wherein the instructions are configured to further cause the at least one processor to display a region corresponding to at least one sound of the item based at least in part on properties of the gesture, when the region receives an input.

5. The electronic device of claim 4, wherein the at least one processor is further configured by the instructions to output the sound data while changing at least part of properties of the sound data based at least in part on properties of the gesture.

6. The electronic device of claim 4, wherein the at least one processor is further configured by the instructions to:
display an item corresponding to the at least one musical instrument through another display operatively connected with the electronic device.

7. The electronic device of claim 6,
wherein the at least one musical instrument comprises a first musical instrument and a second musical instrument,
wherein the at least one sound comprises a first sound and a second sound,
wherein the gesture corresponds to the first musical instrument, and
wherein the at least one processor is further configured by the instructions to obtain another gesture and output the second sound, if the other gesture is a gesture corresponding to the second musical instrument.

8. The electronic device of claim 7, wherein the second sound is output concurrently with at least part of the first sound.

9. The electronic device of claim 7, wherein the at least one processor is further configured by the instructions to display a first item corresponding to the first musical instrument concurrently with a second item corresponding to the second musical instrument during at least part of a time.

10. The electronic device of claim 9, further comprising:
a second display,
wherein the at least one processor is further configured by the instructions to display the first item through the display and display the second item through the second display.

11. A method for playing a virtual musical instrument in an electronic device including a memory for storing at least one sound data corresponding to at least one musical instrument, the method comprising:
obtaining a gesture of a user of the electronic device through at least one sensor operatively connected with the electronic device;
outputting the at least one sound data through an output device operatively connected with the electronic device, if the gesture is a gesture corresponding to the at least one musical instrument; and
not outputting the at least one sound data, if the gesture is not the gesture corresponding to the at least one musical instrument,
wherein the outputting comprises displaying a region corresponding to at least one sound of an item based at least in part on properties of a gesture, when the region receives an input.

12. The method of claim 11, wherein the outputting of the sound data comprises outputting the sound data while changing at least part of properties of the sound data based at least in part on properties of the gesture.

13. The method of claim 11, wherein the outputting of the sound data comprises displaying an item corresponding to the at least one musical instrument through a display operatively connected with the electronic device.

14. The method of claim 13, wherein the not outputting of the sound data comprises performing another function or an application in response to the gesture.

15. The method of claim 14,
wherein the at least one musical instrument comprises a first musical instrument and a second musical instrument,
wherein the at least one sound comprises a first sound and a second sound, and
wherein the outputting of the sound data comprises:
outputting the first sound, if the gesture is the gesture corresponding to the first musical instrument, and
outputting the second sound, if the gesture is a gesture corresponding to the second musical instrument.

16. The method of claim 15, further comprising:
obtaining another gesture; and
outputting the second sound, if the other gesture is the gesture corresponding to the second musical instrument,
wherein the gesture corresponds to the first musical instrument.

17. The method of claim 16, wherein the second sound is output concurrently with at least part of the first sound.

18. The method of claim 16, further comprising outputting a musical instrument corresponding to an external device connected with the electronic device.

19. The method of claim 18, further comprising:
receiving another user gesture from the external device; and
outputting a musical instrument performance sound in response to the other user gesture received from the external device.

20. A non-transitory computer-readable recording medium storing thereon instructions executed by at least one processor to perform a method, the method comprising:
obtaining a gesture of a user of an electronic device through at least one sensor operatively connected with the electronic device, the electronic device including a memory for storing at least one sound data corresponding to at least one musical instrument;
outputting the at least one sound data corresponding to the at least one musical instrument through an output device operatively connected with the electronic device, if the gesture is a gesture corresponding to the at least one musical instrument; and not outputting the sound data, if the gesture is not the gesture corresponding to the at least one musical instrument, wherein the outputting comprises displaying a region corresponding to at least one sound of an item based at least in part on properties of a gesture, when the region receives an input.

\* \* \* \* \*